United States Patent
Szilagyi et al.

(10) Patent No.: US 11,481,974 B2
(45) Date of Patent: Oct. 25, 2022

(54) MESH OPTIMIZATION FOR COMPUTER GRAPHICS

(71) Applicant: VNTANA, INC., Chatsworth, CA (US)

(72) Inventors: Bela Szilagyi, Monrovia, CA (US); Jure Ratković, Zagreb (HR); Hayk Bezirganyan, Burbank, CA (US); Ashley Crowder, Culver City, CA (US); Benjamin Conway, Chicago, IL (US)

(73) Assignee: VNTANA, INC., Chatsworth, CA (US)

( * ) Notice: Subject to any disclaimer, the term of this patent is extended or adjusted under 35 U.S.C. 154(b) by 0 days.

(21) Appl. No.: 17/152,422

(22) Filed: Jan. 19, 2021

(65) Prior Publication Data

US 2021/0225075 A1 Jul. 22, 2021

Related U.S. Application Data

(60) Provisional application No. 62/964,320, filed on Jan. 22, 2020.

(51) Int. Cl.
*G06T 17/20* (2006.01)
*G06T 15/06* (2011.01)

(52) U.S. Cl.
CPC .............. *G06T 17/20* (2013.01); *G06T 15/06* (2013.01)

(58) Field of Classification Search
CPC ........ G06T 17/20; G06T 15/06; G06T 17/205
See application file for complete search history.

(56) References Cited

U.S. PATENT DOCUMENTS

| | | | |
|---|---|---|---|
| 5,666,474 A | 9/1997 | Otto | |
| 7,590,512 B2* | 9/2009 | Shimada | G06T 17/20 703/2 |
| 7,991,595 B2* | 8/2011 | Pao | G06F 16/284 703/2 |
| 8,473,267 B2* | 6/2013 | Velazquez | G06F 30/23 701/4 |
| 2004/0143426 A1 | 7/2004 | Stewart | |
| 2004/0155877 A1* | 8/2004 | Hong | G06T 7/11 345/419 |

(Continued)

FOREIGN PATENT DOCUMENTS

WO 2019/076506 A1 4/2019

OTHER PUBLICATIONS

International Search Report dated Mar. 7, 2021 in connection with International Application No. PCT/US2021/014099.

(Continued)

*Primary Examiner* — Said Broome
(74) *Attorney, Agent, or Firm* — Behmke Innovation Group LLC; Kenneth J. Heywood; Jonathon P. Western

(57) ABSTRACT

According to embodiments herein, a device obtains visualization data that depicts at least one three-dimensional object. The device sanitizes the visualization data, in part by: identifying neighboring polygons of the at least one three-dimensional object and their windings, and correcting errors in the neighboring polygons and their windings. The device also decimates meshes of polygons in the sanitized visualization data, to form compressed visualization data, by: performing one or more sanity checks, prior to performing an atomic decimation operation or texture compression; and storing, by the device, the compressed visualization data in one or more files.

21 Claims, 10 Drawing Sheets

(56) References Cited

U.S. PATENT DOCUMENTS

| | | | |
|---|---|---|---|
| 2006/0058985 A1* | 3/2006 | Arslan | G06F 30/15 703/2 |
| 2006/0090148 A1 | 4/2006 | Zhu | |
| 2011/0183739 A1 | 7/2011 | Anasari | |
| 2012/0082184 A1* | 4/2012 | Lu | G01K 13/25 374/209 |
| 2013/0127848 A1 | 5/2013 | Joshi | |
| 2013/0207976 A1 | 8/2013 | Jenkins | |
| 2015/0145859 A1 | 5/2015 | Corazza et al. | |
| 2020/0015936 A1 | 1/2020 | Ye et al. | |
| 2021/0082184 A1* | 3/2021 | Claessen | A61B 6/14 |

OTHER PUBLICATIONS

Meyer, et al., "Discrete Differential-Geometry Operators for Triangulated 2-Manifolds", online: http://multires.caltech.edu/pubs/diffGeoOps.pdf, Jan. 2002, 26 pages, California Institute of Technology.

Nguyen, Andy, "Computing Curvature CS468 Lecture 8 Notes", online: https://graphics.stanford.edu/courses/cs468-13-spring/assets/lecture8-nguyen.pdf, Apr. 2013, 8 pages, Stanford University.

Sun, et al., "Vertex Normals and Face Curvatures of Triangle Meshes", Chapter 6, online: https://www.dmg.tuwien.ac.at/geom/ig/publications/trifacecurv/trifacecurv.pdf, Oct. 2016, 20 pages, TU Wien, Austria.

Nigam, et al., "A Review: Curvature Approximation on Triangular Meshes", International Journal of Engineering Science and Innovative Technology (IJESIT), vol. 2, Issue 3, May 2013, 10 pages.

"Barycentric Coordinate System", online: https://en.wikipedia.org/wiki/Barycentric_coordinate_system, Dec. 14, 2020, 12 pages, Wikimedia Foundation, Inc.

"Singular Value Decomposition", online: https://en.wikipedia.org/wiki/Singular_value_decomposition, Dec. 19, 2020, 19 pages, Wikimedia Foundation, Inc.

"Degeneracy (Mathematics)", online: https://en.wikipedia.org/wiki/Degeneracy_(mathematics)#In_geometry, Dec. 10, 2020, 5 pages, Wikimedia Foundation, Inc.

Theisel, et al., "Normal Based Estimation of the Curvature Tensor for Triangular Meshes", Proceedings of the 12th Pacific Conference on Computer Graphics and Applications, Oct. 2004, 10 pages, IEEE.

Knill, Oliver, "Eigenvalues and Eigenvectors of 2x2 Matrices", Mathematics Math21b, Linear Algebra and Differential Equations, Fall 2004, 2 pages, Harvard University.

Vidal, et al., "Combinatorial Mesh Optimization", Visual Computer, vol. 28, No. 5, May 2020, pp. 511-525, Springer Verlag.

Meyer, et al., "Generalized Barycentric Coordinates on Irregular Polygons", Journal of Graphics Tools, vol. 7, No. 1, Jul. 2002, 5 pages.

Low, et al., "Model Simplification Using Vertex-Clustering", Proceedings of the 1997 Symposium on Interactive 3D Graphics, Apr. 1997, pp. 75-81, ACM.

"UV Mapping", online: https://en.wikipedia.org/wiki/UV_mapping, Nov. 2020, 2 pages, Wikimedia Foundation, Inc.

Erikson, Carl, "Polygonal Simplification: An Overview", Technical Report, Feb. 1996, 33 pages, University of North Carolina, Chapel Hill, NC.

Limper, Max Alfons, "Automatic Optimization of 3D Mesh Data for Real-Time Online Presentation", Ph.D. Thesis, Jun. 2018, 180 pages, Darmstadt, Technische Universitat.

Botsch, et al., "Geometric Modeling Based on Triangle Meshes", EUROGRAPHICS, Jan. 2006, 106 pages.

"Geometry Instancing", online: https://en/wikipedia/org/wiki/Geometry_instancing, Oct. 2020, 2 pages, Wikimedia Foundation, Inc.

Sara, et al., "Image Quality Assessment through FSIM, SSIM, MSE and PSNR—A Comparative Study", Journal of Computer and Communications, vol. 7, No. 3, Mar. 2019, pp. 8-18, Scientific Research Publishing.

* cited by examiner

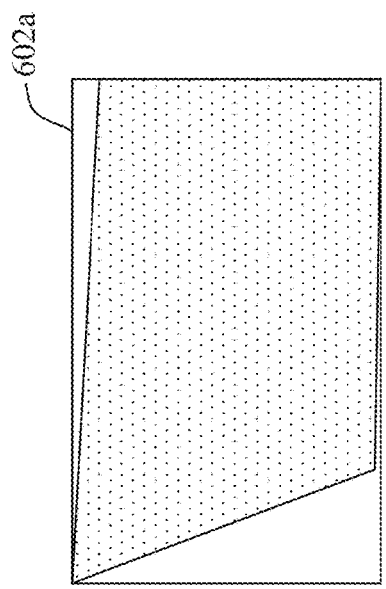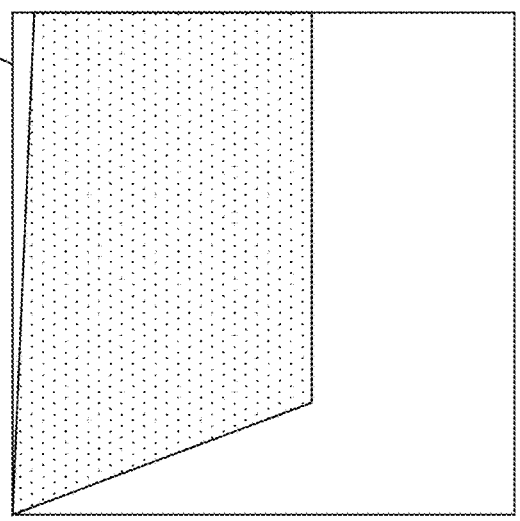
FIG. 6

MESH OPTIMIZATION FOR COMPUTER GRAPHICS

RELATED APPLICATION

This application claims the benefit of and priority to U.S. Prov. Appl. Ser. No. 62/964,320, filed Jan. 22, 2020, entitled MESH OPTIMIZATION FOR IMAGE PROCESSING, by Bela Szilagyi, et al., the contents of which are incorporated herein by reference.

TECHNICAL FIELD

The present disclosure relates generally to computer graphics, and, more particularly, to mesh optimization for computer graphics.

BACKGROUND

While visualization hardware continues to improve, there still remain opportunities to improve the numerical representation of visual data. This holds in a number of contexts, ranging from traditional two-dimensional (2D) television (e.g., ultra-high-definition television), to cellphones, to various virtual reality (VR) and augmented reality (AR) devices, to even holographic representation of some three-dimensional (3D) images. Indeed, many modern displays and cutting-edge holograms now support resolutions beyond what the human eye can perceive.

As a result of the increasing capabilities of visualization hardware, there is also a corresponding increase in the amount of visualization data that needs to be transmitted over a computer network, as well as processed by the endpoint device. This is particularly true in the case visualization data for the rendering of high-quality 3D objects, which can be quite data-intensive. Moreover, there are hundreds of different 3D file types, with each being optimized for its own specific software. Consequently, converting and exporting 3D objects from one file type to another can also lead to various issues and degradation of the 3D objects.

SUMMARY

According to embodiments herein, a method is disclosed that comprises obtaining, by a device, visualization data that depicts at least one three-dimensional object. The method also comprises sanitizing, by the device, the visualization data, in part by: identifying neighboring polygons of the at least one three-dimensional object and their windings, and correcting errors in the neighboring polygons and their windings. The method also comprises decimating, by the device, meshes of polygons in the sanitized visualization data, to form compressed visualization data, by performing one or more sanity checks, prior to performing an atomic decimation operation. The method further comprises storing, by the device, the compressed visualization data in one or more file.

In some embodiments, the obtained visualization data is obtained from one or more files that use a different file format than that of the one or more files in which the compressed visualization data is stored. In a further embodiment, the method further comprises determining, by the device, whether each polygon in the visualization data is a visible polygon, in part by testing whether that polygon is reachable by at least one of a plurality of light rays extending from infinity; and removing, by the device, any polygon from the visualization data that is not a visible polygon. In yet another embodiment, determining whether each polygon in the visualization data is a visible polygon comprises iteratively testing whether a given polygon is visible by a visible polygon and, if so, deeming that polygon as being a visible polygon. In a further embodiment, the method also comprises assigning a material index to a particular mesh, wherein the material index indicates at least one of: a degree of metalness, roughness, glossiness, specularity, or other material properties of the particular mesh. In another embodiment, the method further comprises compressing textures of the visualization data, wherein a degree of compression applied to a particular texture is based on its associated material index. In an additional embodiment, the method comprises applying, by the device, instance detection to two meshes, to determine whether the two meshes are instances of one another; and removing, by the device, duplicate instances from the visualization data. In another embodiment, the method comprises applying instance detection to buckets of sub-meshes of the two meshes. In one embodiment, the method comprises uploading the one or more files to an online service for download. In yet another embodiment, the method comprises quantifying degeneracy of a particular polygon on a numeric scale. In a further embodiment, the method also comprises using a machine learning model to compare the visualization data and the compressed visualization data.

In an additional embodiment, decimating the meshes comprises identifying parallel geometries in the visualization data by: flagging intersecting polygons, applying instance detection, to identify meshes that are similar to one another, and identifying the parallel geometries, based in part on the flagged intersecting polygons and meshes that are similar to one another. In a further embodiment, decimating the meshes also comprises removing obstructed parallel geometries from the visualization data.

In further embodiments, the one or more sanity checks comprise at least one of: determining whether a set of polygons intersect another polygon, determining whether a decimated set of polygons would intersect another polygon, determining whether a local curvature of a set of polygons would be preserved after undergoing the atomic decimation operation, determining whether a maximum curvature of a set of polygons would exceed a predefined threshold after undergoing the atomic decimation operation, determining whether a degeneracy of a set of polygons would increase after the set of polygons undergoes the atomic decimation operation, ensuring that orientations of a set of polygons would be preserved after undergoing the atomic decimation operation, ensuring that a set of neighboring polygons undergoing the atomic decimation operation are also neighbors in a UV space, ensuring that shading and geometric normal errors resulting from the atomic decimation operation are within a predefined threshold, ensuring that the atomic decimation operation does not result in an edge of a polygon having a curvature greater than a defined threshold, ensuring that two edges of polygons to be joined are not bifurcated, ensuring that joining two edges of polygons will not result in a concave edge, ensuring that an edge to be flipped is not along a UV boundary, ensuring that two quadrilaterals to be joined by the atomic decimation operation would not result in an area larger than a defined size, ensuring that a polygon edge that would result from joining two quadrilaterals is not longer than a defined threshold, ensuring that the atomic decimation operation would not shift a vertex by a predefined amount, or ensuring that a material index of a mesh to be joined with the particular mesh by the atomic decimation operation matches the material index of the particular mesh.

According to various embodiments, a tangible, non-transitory, computer-readable medium is disclosed that stores program instructions that cause a device to execute a process comprising: obtaining, by the device, visualization data that depicts at least one three-dimensional object. The process also comprises sanitizing, by the device, the visualization data, in part by: identifying neighboring polygons of the at least one three-dimensional object and their windings, and correcting errors in the neighboring polygons and their windings. The process further comprises decimating, by the device, meshes of polygons in the sanitized visualization data, to form compressed visualization data, by: performing one or more sanity checks, prior to performing an atomic decimation operation. The process additionally comprises storing, by the device, the compressed visualization data in one or more files.

In additional embodiments, an apparatus comprises one or more network interfaces, a processor coupled to the one or more network interfaces and configured to execute one or more processes, a memory configured to store a process that is executable by the processor. When executed, the process is configured to obtain visualization data that depicts at least one three-dimensional object. The process is also configured to sanitize the visualization data, in part by: identifying neighboring polygons of the at least one three-dimensional object and their windings, and correcting errors in the neighboring polygons and their windings. The process is further configured to decimate meshes of polygons in the sanitized visualization data, to form compressed visualization data, by performing one or more sanity checks, prior to performing an atomic decimation operation. The process is additionally configured to store the compressed visualization data in one or more files.

Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example of texture compression;

DESCRIPTION OF EXAMPLE EMBODIMENTS

Figure 1:
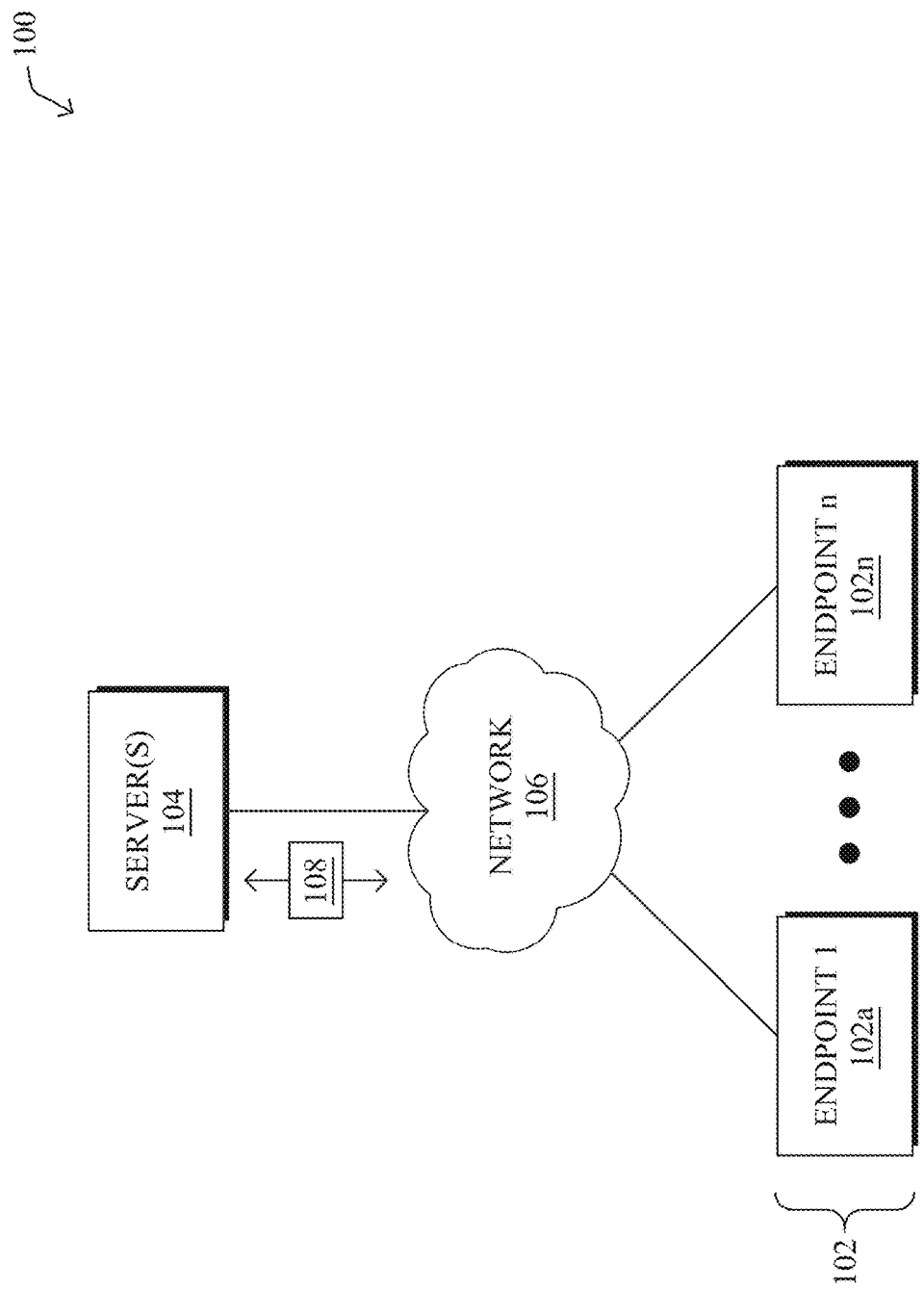
FIG. 1 illustrates an example communication system.

FIG. 1 illustrates an example communication system 100, according to various embodiments. As shown, communication system 100 may generally include n-number of endpoint devices 102 (e.g., a first endpoint device 102a through $n^{th}$ endpoint device 102n) interconnected with one or more servers 104 by a network 106.

In general, endpoint devices 102 may comprise computing devices capable of storing, processing, and communicating data. For instance, endpoint devices 102 may comprise mobile phones, tablets, wearable electronic devices (e.g., smart watches, smart glasses, etc.), desktop computers, or any other known form of device capable of performing the techniques herein.

During operation, endpoint devices 102 and server(s) 104 may be communicatively coupled with one another, either directly or indirectly, such as by leveraging a communication infrastructure that forms network 106. For instance, devices 102 and server(s) 104 may communicate with one another via the Internet or form of network 106 (e.g., a multiprotocol label switching network, etc.). Accordingly, network 106 may comprise any number of wide area networks (WANs), local area networks (LANs), personal area networks (PANs), and/or direct network connections between any of these components.

More specifically, example network connections and infrastructure of network 106 may include, but are not limited to, connections that leverage wireless approaches such as Wi-Fi, cellular, satellite, and the like, and/or wired approaches such as Ethernet, cable Internet, fiber optics, and the like. In further embodiments, endpoint devices 102 may communicate directly with one another using a shorter-range communication approach, such as via Bluetooth, Z-Wave, ZigBee, 6LoWPAN, other near field communication (NFC) approaches, infrared, visible light, or the like. In yet another embodiment, one of devices 102 may provide connectivity to network 106 on behalf of the other, essentially acting as a communications relay.

Server(s) 104 may comprise one or more servers that provide a service configured to facilitate the transfer of visualization data 108 between server(s) 104 and endpoint devices 102. Generally speaking, visualization data 108 may take the form of any number of files that, when processed by a receiving endpoint device in endpoint devices 102, causes that endpoint device to render visualization data 108 onto one or more electronic displays associated with the endpoint device. For instance, the endpoint device may display visualization data 108 via an integrated screen, one or more monitors, one or more televisions, one or more virtual reality (VR) or augmented reality (AR) displays, one or more projectors of a hologram system, or the like.

For instance, endpoint device 102a may upload visualization data 108 to a server 104 that is later downloaded by endpoint device 102n and displayed to a user. As noted above, the ever-improving visualization hardware of endpoint devices, such as endpoint devices 102, there is a corresponding increase in the amount of visualization data 108 that needs to be communicated across network 106. In addition, this increase in visualization data 108 will also result in greater resource consumption by the receiving endpoint device 102n. Accordingly, efficiency in data compression and rendering are essential to providing the best possible image and performance with respect to visualization data 108.

Optimizing visualization data 108 can also be quite beneficial with respect to converting and exporting visualization data from one 3D file into another. Indeed, there are upwards of hundreds of different 3D file types, each of which is optimized for its own specific software. For instance, Blend uses the BLEND file format, AutoCAD uses the .DWG format, Clo uses the .zprj format, Browzwear uses the .bw format, etc. This causes problems because these proprietary formats cannot be used in other programs. While there are also neutral file formats, such as .FBX, the conversion and extraction of 3D files often leads to issues such as the following:

Flipped normal

Maps becoming distorted or lost

Specular/glossy conversion to metal/roughness might only be done partially or not all Degenerate or missing polygons Excess metadata that inflates the file size In addition, attempting to use 3D files on certain platforms such as Facebook, Snapchat, Google Swirl, web AR, etc., can also require the use of a variety of 3D files because each platform has its own file specifications for:

File type

File size limit

Texture type

Texture size limit

Figure 2:
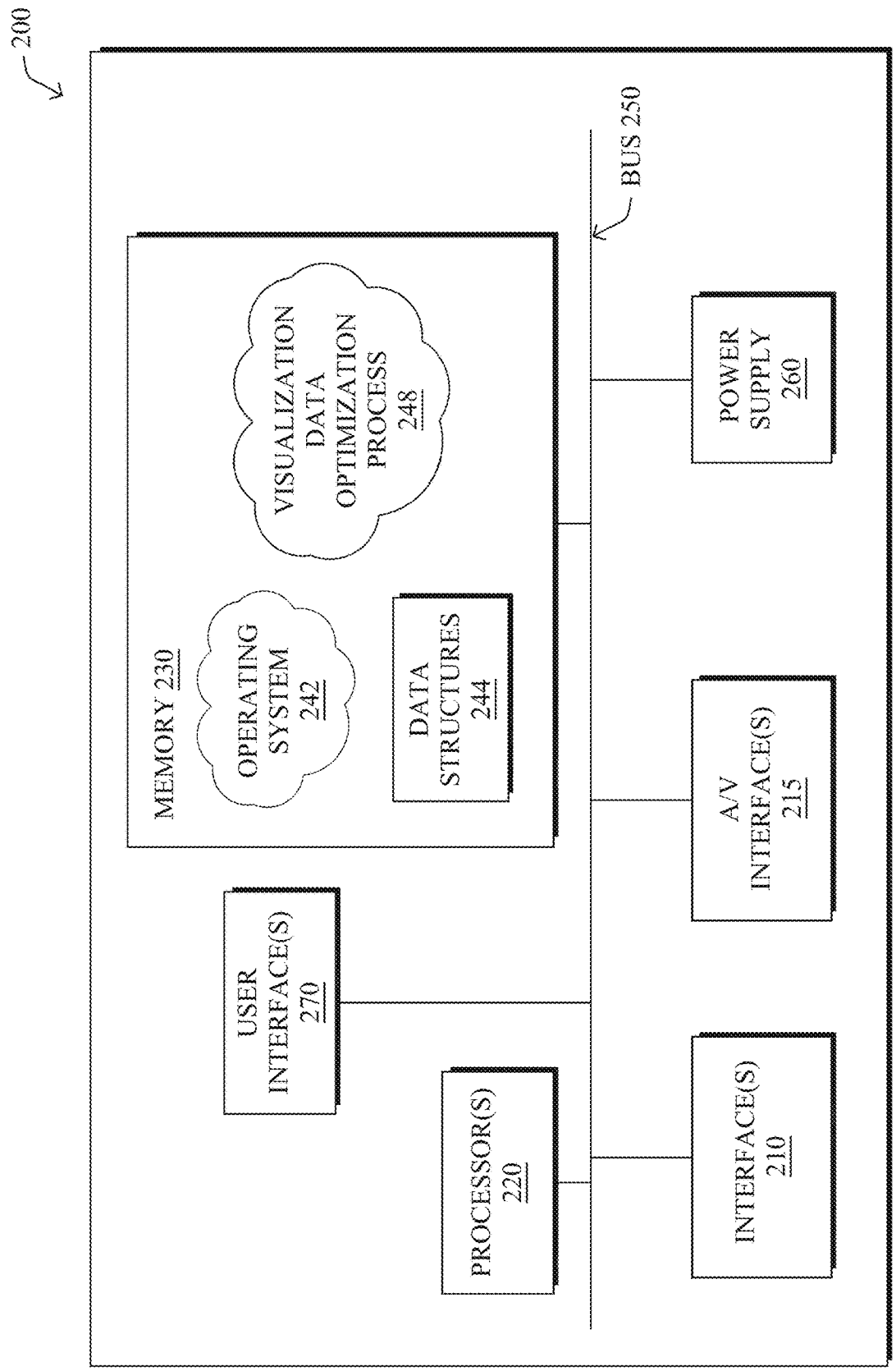
FIG. 2 illustrates an example device.

FIG. 2 illustrates an example schematic block diagram of a computing device 200 that may be used with one or more embodiments described herein, such as any of endpoint devices 102 and/or server(s) 104 shown in FIG. 1, or another device in communication therewith (e.g., an intermediary device). The illustrative device may comprise at least one network interface 210, one or more audio/video (A/V) interfaces 215, at least one processor 220, a memory 230, and user-interface components 270 (e.g., keyboard, monitor, mouse, etc.), interconnected by a system bus 250, as well as a power supply 260. Other components may be added to the embodiments herein, and the components listed herein are merely illustrative.

The network interface(s) 210 contain the mechanical, electrical, and signaling circuitry for communicating data over links coupled to a computer network. A/V interfaces 215 contain the mechanical, electrical, and signaling circuitry for communicating data to/from one or more A/V devices, such as cameras, displays, etc. The memory 230 comprises a plurality of storage locations that are addressable by the processor(s) 220 for storing software programs and data structures associated with the embodiments described herein. The processor(s) 220 may comprise hardware elements or hardware logic adapted to execute the software programs and manipulate the data structures 244. An operating system 242, portions of which are typically resident in memory 230 and executed by the processor, functionally organizes the machine by invoking operations in support of software processes and/or services executing on the machine. These software processes and/or services may comprise a visualization data optimization process 248, among other processes, according to various embodiments.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, where certain processes have been shown separately, those skilled in the art will appreciate that processes may be routines or modules within other processes.

During execution, visualization data optimization process 248 may perform a series of optimizations with respect to visualization data, thereby providing efficient data compression of the visualization data. As would be appreciated, these optimizations not only help to reduce the size of the file(s) in which the visualization data is located for purposes of communicating the file(s) across a network, but also help to reduce the resource loads on the endpoint device(s) consuming the file(s). Indeed, by optimizing the visualization data, less powerful endpoint devices, such as cellular phones, can download and render the visualization data quicker. In addition, the reduced and optimized visualization data from visualization data optimization process 248 will allow the user also to seamlessly manipulate any 3D objects in the visualization data (e.g., rotating, zooming, etc.) and/or to quickly jump to another 3D object of interest. In some cases, the optimization techniques introduced herein and leveraged by visualization data optimization process 248 also provide for the conversion of one file format to another. This is helpful, for instance, in taking manufacturing design files for AutoCad or Solidworks that are too large to use in marketing materials for web, mobile, VR/AR, etc., and shrinking them down to a usable size without affecting the overall quality of the shape and image.

In particular, certain aspects of the optimization techniques introduced herein can be used to simplify over-resolved 3D surface meshes, while controlling the loss of quality due to mesh reduction. Consequently, the amount of data of the file can be reduced, while still ensuring an acceptable level of image quality.

Before delving into the specifics of the techniques herein, an explanation of the terminology used herein is needed. In general, a 3D object may be rendered by representing a particular object, as well as the overall scene, as a series of meshes. More specifically, a 'scene' S may be defined as a set of surface meshes $M_i$ as follows:

$$S=\{M_i, i=0,1,\ldots\}$$

Likewise, a surface mesh $M_i$ is defined by a set of polygons $P_j$:

$$M_i=\{P_l, l=0,1,\ldots\}$$

Figure 3B:
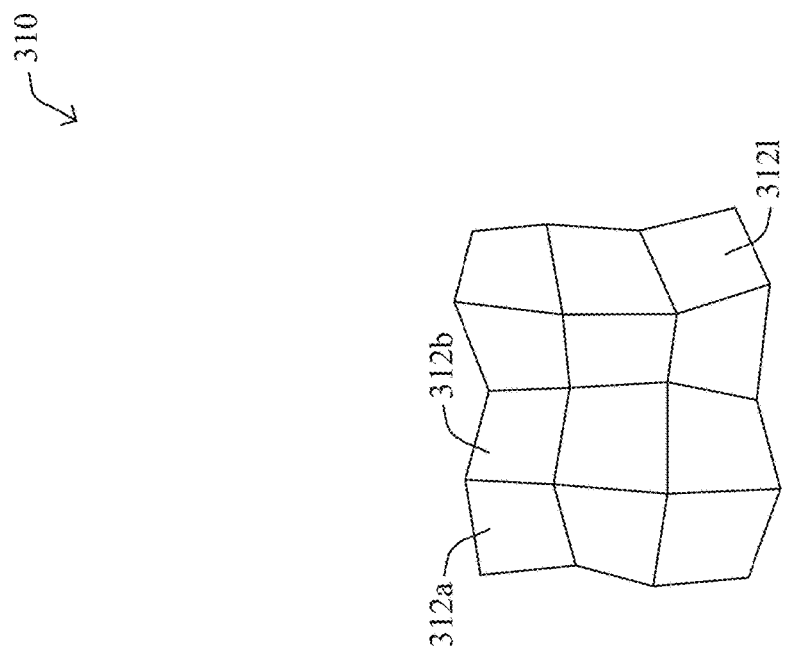
FIGS. 3A-3B illustrate example meshes in visualization data.
Figure 3A:
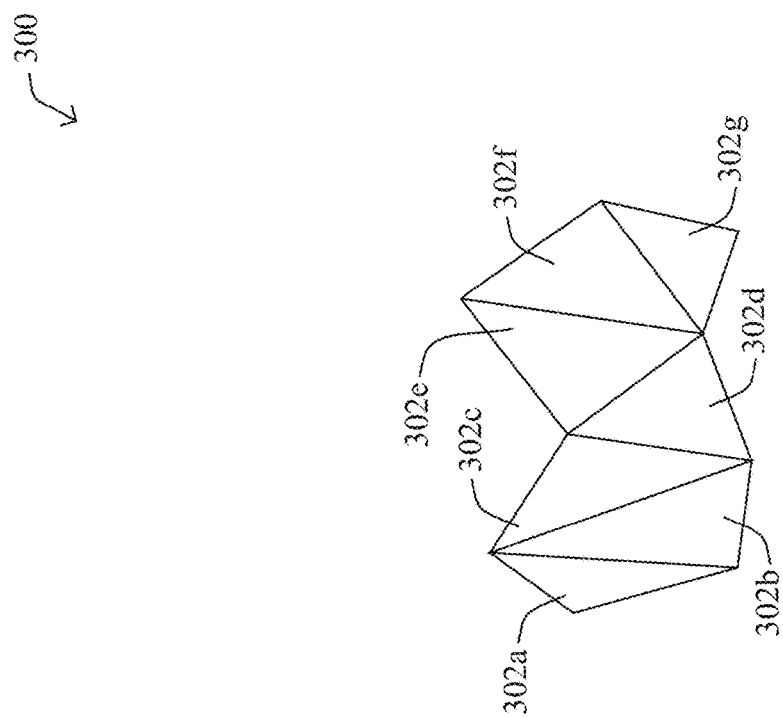

FIGS. 3A-3B illustrate example meshes that may be formed using different types of polygons. More specifically, mesh 300 in FIG. 3A may comprise a set of triangles 302a-30g. Likewise, mesh 310 in FIG. 3B may comprise a set of quadrilaterals 312a, 312b, . . . , 312l. As would be appreciated, different meshes may employ different types of polygons.

Formally, a polygon of a mesh is defined by a set of edges as follows:

$$P_j=\{E_j, E_{j+1}, \ldots E_{j+n-1}\},$$

where n is the rank of the polygon.

Likewise, edges are defined by two vertices at the two end-points, as follows:

$$E_j=[V_k, V_{k+1}]$$

The geometric location of the vertex $V_k$ is given by its position vector:

$$\overline{P_k}=(x_k, y_k, z_k)$$

This allows for definition of the tangent of edge $E_1$, as follows:

$$\overline{T_j}=(\overline{P_{k+1}}-\overline{P_k})/\|(\overline{P_{k+1}}-\overline{P_k})\|$$

where the norm of a vector v is defined in the Euclidean sense, $$\|\overline{v}\|=\sqrt{v_x^2+v_y^2+v_z^2}$$

By convention, an edge belongs to exactly one polygon, meaning that if two polygons share a side, there will be two collocated edges defined for the two polygons. Similarly, a vertex belongs to exactly one edge, meaning that if multiple edges converge at a single geometric point, there will be multiple collocated vertices defined at that point, one for each edge.

In addition to its position vector $\overline{P_k}$, a vertex $V_k$ may also have additional properties such as a shading normal $\overline{N_k^S}$, tangent, bi-tangent, as well as a pointer to a UV map. As would be appreciated, UV mapping is a modeling approach whereby a 2D image is projected to the surface of a 3D model, for purposes of texture mapping. Here, the 'U' and 'V' are used as coordinate axes in the 2D image, whereas 'X,' 'Y,' and 'Z' are used to denote the axes in the 3D space.

Note also that the shading normal $\overline{N_k^S}$ provided at a vertex may or may not be the same as the geometric normal $\overline{N_k^G}$ to the surface in the neighborhood of the vertex. This shading normal $\overline{N_k^S}$ can be thought of as an additional degree of freedom used to specify how to smooth the surface, when reconstructed, as it passes through the vertex.

Given two neighboring edges $E_{j_1}, E_{j_2}$ belonging to the same polygon, the geometric normal at the corresponding vertex $V_k$ is:

$$\overline{N_k^G} = (\overline{T_{j_1}} \times \overline{T_{j_2}}) / \|(\overline{T_{j_1}} \times \overline{T_{j_2}})\|$$

For vertex categorization, given multiple collocated vertices (at the end-points of edges that converge at a single point), one can compare the shading normal $\overline{N_k^S}$ associated with the individual vertices (located at the same geometric point) as a means of telling whether the vertex is embedded into a smooth surface (i.e., all normals are either identical or very close to each other), is situated on an edge (in which case there will be two distinct normal directions), or is situated on a 'corner' (with three or more distinct normal vectors).

An additional way of categorizing a vertex is to compute the geometric normal associated with each pair of edges meeting at the vertex, by taking the vector product between the tangents to those edges.

If the shading normal is regarded as the 'truth,' then the differences between the shading normal and the geometrically-determined normal can be used as a measure of the accuracy of the surface representation.

For a vertex $V_k$ that is located on a geometric edge (i.e., there are two distinct shading normals) two vertices $V_{k+}, V_{k-}$ can be identified with the most similar shading normals $\overline{N_{k+}^S}, \overline{N_{k-}^S}$ that are directly connected to $V_k$. The tangents to the edges can then be computed as follows:

$$E_+ = [V_k, V_{k+}], E_- = [V_{k-}, V_k]$$

Then the curvature of the geometric edge in the neighborhood of the edge will be given by the derivative of the tangent to the curve, which can be estimated via finite differencing:

$$k_k = 2\|\overline{T_+} - \overline{T_-}\| / \|\overline{P_{k+}} - \overline{P_{k+}}\|$$

Here, the factor of 2 accounts for the fact that the tangent vectors approximate the edge tangent at its midpoint while the position vectors are the position of the far-side of the edges.

Figure 4:
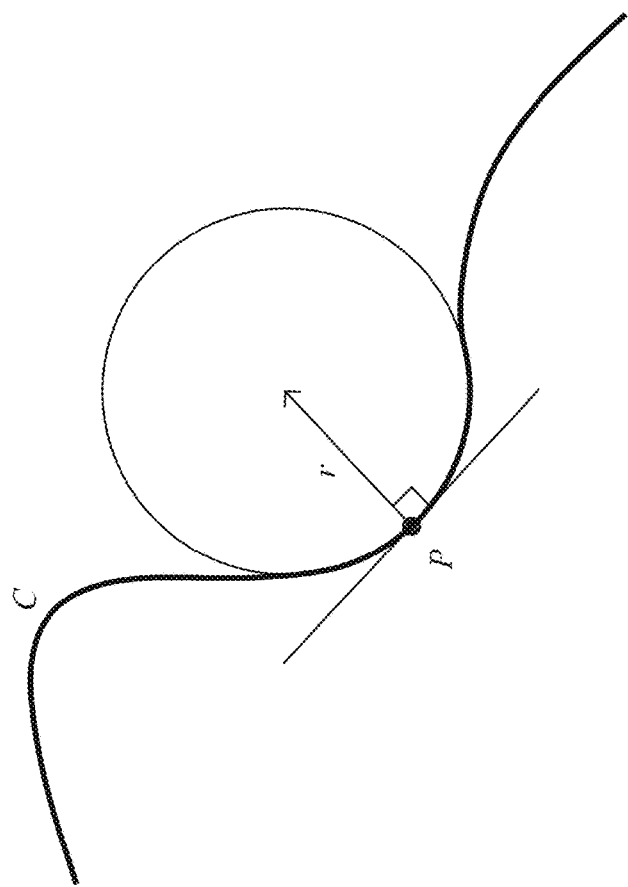
FIG. 4 illustrates an example curvature.

FIG. 4 illustrates an example 400 showing a curvature C. Intuitively, the curvature C is the reciprocal of the radius r of the sphere that best matches the curve, locally.

Regarding edge categorization, an edge can also be categorized in multiple ways, from a variety of standpoints. One simple way of labeling edges is by looking at the vertices at the two ends, giving rise to either 'face-to-face', 'face-to-edge', 'face-to-vertex', 'edge-to-vertex', or 'vertex-to-vertex' type edge. Given an edge:

$$E_j = [V_{j-}, V_{j+}],$$

a local measure of curvature can be assigned to this edge by taking a finite difference derivative of the shading normal $\overline{N_S}$, $$k_j = 2\|\overline{N_{j+}^S} - \overline{N_{j-}^S}\| / \|\overline{P_{j+}} - \overline{P_{j-}}\|$$

Visualization Data Optimizations

According to various embodiments herein, optimization techniques are disclosed herein to optimize visualization data in a number of ways. In some aspects of the techniques herein, meshes, such as those found in 3D objects, can be optimized by identifying polygons that can be joined without an excessive loss of quality. In the process of joining polygons, one will end up with multiple vertices along a given 'side' of the polygon which (under appropriate quality control) can be removed. The end result of the mesh optimization is a reduced polygon count, as well as a reduced vertex count. Naturally, the result of this optimization is a reduction/compression of the visualization data. In further aspects, each polygon can also be individually triangulated, as needed, by the various rendering techniques.

Illustratively, certain aspects of the techniques described herein may be performed by hardware, software, and/or firmware, such as in accordance with the various processes and components described herein, which may contain computer executable instructions executed by the processor 220, such as visualization data optimization process 248, and/or associated hardware components to perform functions relating to the techniques described herein.

Specifically, according to various embodiments, a device obtains visualization data that depicts at least one three-dimensional object. The device sanitizes the visualization data, in part by: identifying neighboring polygons of the at least one three-dimensional object and their windings, and correcting errors in the neighboring polygons and their windings. The device also decimates meshes of polygons in the sanitized visualization data, to form compressed visualization data, by: performing one or more sanity checks, prior to performing an atomic decimation operation; and storing, by the device, the compressed visualization data in one or more files.

Operationally, as an initial processing step, visualization data optimization process 248 in FIG. 2 may first 'sanitize' a 3D file, to fix errors that typically occur during file export. Typically, sanitization is performed to identify neighboring polygons in the visualization data and prior to instancing or the rest of the optimization.

In various embodiments, one step of the sanitization by visualization data optimization process 248 may entail polygon winding and normal sanitization. In general, polygon windings define the direction of the polygons and define what is actually presented to a user on the display.

In some embodiments, as detailed below, visualization data optimization process 248 may identify the current polygon winding and fix any detected errors using an obstructed geometry removal (OGR) approach that flags the number of directions (e.g., out of a possible 32 directions or more) from which the side of a polygon is visible. In turn, visualization data optimization process 248 may apply a polygon orientation classifier that maps 'islands' of polygons that are neighbors and oriented (winding) the same way. Then, visualization data optimization process 248 may tally a count of polygons in a given island that would be seen by a user from the back side and how many would be seen on the front side. If visualization data optimization process 248 determines that a threshold number of polygons would be seen from the backside (e.g., a predefined number, a majority of polygons in the island, etc.), visualization data optimization process 248 may 'flip' the orientation of the entire island. For instance, if a triangle is oriented as 'ABC,' with A, B, and C representing its vertices, flipping the triangle would result in orientation CBA. This determines what is the front and what is the back of the object. As would be appreciated, the front (if non-transparent) covers what is behind it from the viewpoint of the user, meaning that this will affect the OGR processing. If a polygon winding is flipped, visualization data optimization process 248 will also flip the normal vectors associated with it, as well. The implication is that the optimization operations below, such as normal averaging, error correction, smoothing, filling, etc., may also be affected.

According to various embodiments, visualization data optimization process 248 may perform any or all of the following, as part of its sanitization operation:

First, visualization data optimization process 248 may combine meshes in the visualization data, if they have the same characteristics, such as material, texture, or the like. In some embodiments, visualization data optimization process 248 may determine, for each of the polygons, a material index that denotes the material properties of the object, as depicted by the polygon, such as its degree(s) of metalness, roughness, specularity, glossiness, or the like. Visualization data optimization process 248 may determine these characteristics, for instance, based on the texture information for the polygon under scrutiny. For instance, a polygon representing cloth may have a very different material index than that of a polygon representing shiny metal.

Next, visualization data optimization process 248 may optionally resize the overall scene coordinates and/or re-center the overall scene coordinates around the origin of the coordinate system. Such a re-centering may align the 3D object such that the origin of the coordinate system is not off screen, from the vantage point of a user.

Next, visualization data optimization process 248 may flag nearby vertices as identical, even if they exist in neighboring meshes. More specifically, visualization data optimization process 248 may search for pairs of vertices that are within a threshold distance of one another, and flag them as being identical, through a process sometimes referred to as vertex 'welding.' Note that, sometimes, the geometry may become 'warped,' similar to what happens when a tablecloth is pinched, which can cause high-curvature areas that can be problematic during optimization. In one embodiment, visualization data optimization process 248 may also detect such warped geometries and correct for them.

Visualization data optimization process 248 may then identify any connectivity between neighboring polygons. To do so, visualization data optimization process 248 may evaluate the neighboring polygons to determine whether they are part of the same surface or object in the scene or not. For instance, a first polygon may be part of the depiction of the sky while a second, neighboring polygon may be part of the depiction of a 3D car. In such a case, the two polygons may not be connected, despite the two neighboring one another.

Optionally, visualization data optimization process 248 may then perform instancing whereby multiple copies of the same mesh are rendered in the scene at the same time. As would be appreciated, instancing is typically used to reuse geometries and is often used to represent objects such as grass, trees, buildings, or the like. Note also that instancing may also support variations between the rendered meshes, to avoid this repetition being perceivable by the user. Regardless of whether visualization data optimization process 248 performs instancing at this point in time, or later on, visualization data optimization process 248 will still need to perform instancing after the sanitization, to have proper visualization data to optimize/reduce.

Next, visualization data optimization process 248 may perform 'stitching' whereby tiny holes in a mesh are plugged in by new triangles. To this end, visualization data optimization process 248 may employ a surface-oriented repair algorithm, or other suitable repair algorithm, that adds triangles to a mesh, where the mesh is missing polygons. As would be appreciated, stitching on a per-mesh basis can lead to cracks between neighboring meshes. In such cases, visualization data optimization process 248 may detect these cracks and fix them, as well.

Visualization data optimization process 248 may then compute missing normals from either the geometry information of a polygon. Alternatively, visualization data optimization process 248 may compute the missing normals based on any nearby normals.

At this point, visualization data optimization process 248 may then optionally correct any polygons with the wrong winding. In addition, visualization data optimization process 248 may also flip any normals with the wrong orientations (e.g., are inconsistent with their neighbors), optionally.

According to various embodiments, visualization data optimization process 248 may then remove any obstructed geometry, optionally. In some embodiments, visualization data optimization process 248 may do so on a per-polygon basis. As would be appreciated, obstructed geometry removal (OGR) is typically performed by placing a light box in the center of a 3D model and only the geometry reached last is considered 'outside' and kept, with the remainder of the geometry removed (i.e., a spherical approach). In another approach, visualization data optimization process 248 may leverage a more sophisticated approach in which it leverages multiple light boxes, at multiple centers, and keeps those polygons that are deemed visible when using any of the boxes.

According to various embodiments, visualization data optimization process 248 may perform OGR by probing every single polygon for visibility by attempting to reach it with a straight line (light ray) from infinity, from a large number of directions. During prototyping, 128 different directions were used. However, any number of different directions could also be used, as desired. In turn, if the polygon is visible from infinity (i.e., from the outside) along any of those directions, visualization data optimization process 248 may flag it as visible. This allows for uniform detection of visible polygons, resulting in a more accurate definition of what is "outside" and should stay.

Figure 5:
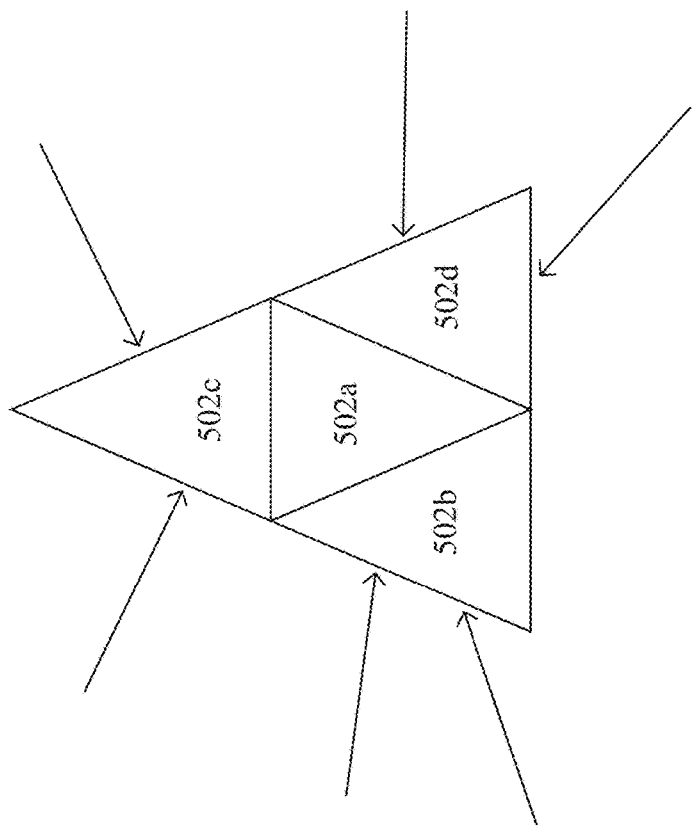
FIG. 5 illustrates an example of obstructed geometry removal.

FIG. 5 illustrates a simplified example 500 of the OGR operation, according to various embodiments. As shown, assume that visualization data optimization process 248 is assessing the visibility of a polygon 502*a*. In such a case, it may project a set of light rays 504 from n-number of directions from infinity towards polygon 502*a*. Assume, however, that polygon 502*a* is surrounded by opaque polygons 502*b*, 502*c*, 502*d*, etc. As would be appreciated, example 500 is shown in 2D for purposes of illustration. However, visualization data optimization process 248 will typically assess the visibility of polygons in 3D. Accordingly, it can also be assumed that polygon 502*a* is surrounded by other opaque polygons and tested using light rays 504 from any number of other directions. Since none of light rays 504 are able to reach polygon 502*a*, visualization data optimization process 248 may determine that polygon 502*a* constitutes an obstructed geometry that can be removed.

Referring again to FIG. 2, as a further expansion of the visibility detection, visualization data optimization process 248 may also employ what is referred to herein as 'cave detection,' according to various embodiments. Under this approach, after having flagged visible polygons based on what is reachable from infinity, visualization data optimization process 248 may further iterate and flag the polygons reachable via a light ray from another polygon that is already visible. That is, the visibility of a polygon may be 'contagious.' Thus, if polygon X is visible and it can 'see' polygon Y, that makes polygon Y visible as well. Visualization data optimization process 248 may then stop iterating once the last iteration yields no new visible polygons. This approach is particularly well suited for objects such as shoes and other objects that have concave structures. During the cave detection, visualization data optimization process 248 may also identify and correct for intersecting polygons, as needed.

In further embodiments, another operation that visualization data optimization process 248 may perform is to fill textures such that textures in assets can be exported without any padding at the end of the UV space, which can cause black lines, or other incorrectly colored lines, when filtering needs to sample a larger area (e.g., the camera is zoomed out or looking at a sharp angle). To prevent this, visualization data optimization process 248 may perform any of the following, or another suitable technique:

1. Visualization data optimization process 248 may automatically fill the textures with additional pixel values based on the values already present in the texture, thereby preventing incorrectly colored lines (usually black) when the 3D model is stitched together. The boundaries at which filling starts are defined by the mesh's UV space, not the texture contents. Every pixel and its location used by the mesh are collected by rasterizing every UV triangle onto the pixel space of the texture. Then, the texture is blurred (using a gaussian or other technique), effectively replacing hard color edges on UV boundaries with smooth edges. Finally, optimization process 248 may place the previously collected pixels back into their place, ensuring that the used parts of the texture remain sharp.
2. Visualization data optimization process 248 may automatically fill the textures with additional pixel values based on the values already present in the texture, thereby preventing incorrectly colored lines (usually black) when the 3D model is stitched together. The boundaries at which filling starts are defined by the mesh's UV space, not the texture contents. Every pixel and its location used by the mesh are collected by rasterizing every UV triangle onto the pixel space of the texture. Then, the texture is blurred (using a gaussian or other technique), effectively replacing hard color edges on UV boundaries with smooth edges. Finally, optimization process 248 may place the previously collected pixels back into their place, ensuring that the used parts of the texture remain sharp.

A further operation that visualization data optimization process 248 may perform relative to the textures is to compress the textures in the visualization data. This optimization task may be included as part of the sanitization operation or, alternatively, performed at a different time. In some instances, one goal of the texture compression is to remove unused space by cropping textures, which significantly reduces the overall file size, with no change to the look of the 3D object. Note that what constitutes unused space is defined by the UV space of a mesh, not the texture contents. Different texture wrapping modes may also be taken into account.

FIG. 6 illustrates an example 600 of the removal of unused space from a texture, in some embodiments. As shown, assume that there is a texture 602*a* that comprises quite a bit of unused space. As part of the texture optimization, visualization data optimization process 248 may reduce texture 602 into reduced texture 602*a* by removing this unused space.

Referring again to FIG. 2, visualization data optimization process 248 may resize textures based on their associated texel densities. For instance, a button could have a 4K texture, but it is a tiny aspect of the entire 3D model. Accordingly, it should be resized based on its percentage of the whole model. Visualization data optimization process 248 may also compress the textures using a lossy or lossless approach, depending on a configurable parameter (e.g., on a scale ranging from 1-lossy to 10-lossless).

According to various embodiments, another texture optimization that visualization data optimization process 248 may employ is referred to herein as 'material-based' texture compression. Indeed, a key observation herein is that the amount of compression that a texture can withstand depends on the material that it depicts. For example, normal maps contain geometric data encoded in red-green-blue (RGB) colors. This implies that lossy normal map compression introduces normal error into the normal data of the mesh. This error is proportional to the aggressiveness of the lossy or lossless compression. Thus, the acceptable amount of error depends on the material. For example, shiny surfaces like metals or polished leather are much more sensitive to normal errors than diffuse materials, such as cloth. To this end, visualization data optimization process 248 may determine the maximum amount of texture compression to use, based on the material index of the texture (e.g., its metalness, roughness, specularity, etc.), that will not result in visible shading errors.

A further texture optimization that visualization data optimization process 248 may perform is texture atlassing. Here, visualization data optimization process 248 may combine many smaller texture files into a larger 'atlas.' Doing so can further help to reduce file sizes, increase texture loading speeds, and improve rendering performance.

Optionally, visualization data optimization process 248 may, as part of its sanitization operation, also compute normals for assets that include no normals, whatsoever, and/or replace existing ones with new ones. In addition, visualization data optimization process 248 may optionally split all polygons into triangles and/or reconstruct a quadrilateral-based mesh, if it clearly detects that this was a quadrilateral mesh split into triangles.

Next, visualization data optimization process 248 may extract textures from embedded Filmbox (.fbx), GL Transmission Format (.gltf), or other similar files, or embed them into a non-embedded file, such as a .fbx file. Note that this step may or may not be performed as part of the sanitization operation.

Another potential step of the sanitization operation may be to remove degenerate polygons (e.g., those with zero area) and/or degenerate edges (e.g., those with lengths smaller than a defined value). Similarly, visualization data optimization process 248 may also split concave polygons (e.g., star shape) or polygons with a degenerate shape into triangles.

Next, visualization data optimization process 248 may detect hard edges and mark them as such, to preserve them during optimization. In turn, visualization data optimization process 248 may also remove any stray vertices and/or duplicate polygons.

At the end of its sanitization operation, visualization data optimization process 248 may perform any number of sanity checks, to ensure (and enforce) that all polygons have complete UV and normals data. When they do not, visualization data optimization process 248 may raise an error exception.

Similarly, visualization data optimization process 248 may also check that all polygons have acceptable shapes and that all edges have acceptable lengths (e.g., that they are not tiny and shorter than a defined threshold). If not, visualization data optimization process 248 may also raise an error exception to the sanitization operation. In further embodiments, visualization data optimization process 248 may first attempt to rectify the problem, before terminating the sanitization operation.

Once visualization data optimization process 248 has completed its sanitization operations, it may also optimize the visualization data by performing mesh decimation, according to various embodiments. In general, the benefits of mesh decimation are to reduce file size as well as faster rendering. While some mesh decimation approaches exist, such as vertex removal or quad merger, the techniques herein introduce a decimation approach that builds the sequence in which the decimation operations are done, as well as sanity checks that are performed on the potential outcome of each atomic mesh operation before it is actually applied, to avoid errors in the 3D model. The polygons that are to be changed by the atomic step are referred to as 'input' polygons and the resulting polygons (that were not on the mesh prior to the optimization step) are referred to as the 'output' polygons.

According to various embodiments, visualization data optimization process 248 may perform any or all of the following sanity checks, during its mesh decimation operations:

1. If any of the input polygons are intersecting another polygon, visualization data optimization process 248 may cancel the operation.
2. If any of the output polygons would be intersecting another polygon, visualization data optimization process 248 may cancel the operation. This check and the above check are fundamental in preserving the topology of the mesh, as detailed below.
3. Visualization data optimization process 248 may also compare the geometric area of the input polygons with those that come out. If the local curvature of the surface is not preserved well by the operation, the area will be changing beyond what is acceptable, and visualization data optimization process 248 may cancel the operation.
4. Visualization data optimization process 248 may also compare the degeneracy of the input triangles with those of the output. If any of the output triangles are more degenerate than the input (up to some threshold), visualization data optimization process 248 may cancel the operation.
5. Visualization data optimization process 248 may also do the same comparison for proper degeneracy (the degeneracy of the polygon computed in the proper frame) of the input and output triangles.
6. All polygons that go into an atomic tri reduction must exist on the same 'UV island' (that is, if they are neighbors in geometric space, they also must be so in UV space). If this is not the case, visualization data optimization process 248 may cancel the operation.
7. The shading and geometric normal error resulting from the optimization step must be within some threshold, or else visualization data optimization process 248 may cancel the operation.
8. The max curvature of the output polys cannot be larger than some threshold times that of the input polys.
9. Each of the output polygon must have the same orientation as the mean orientation of the input polygons. That is, the mean geometric normal of the input cannot have a negative dot product with the geometric normal of any of the input polygons.
10. When collapsing an edge that is non-degenerate (i.e., it is not very short), visualization data optimization process 248 may disallow output triangles where either of the edges has a curvature larger than some threshold.
11. When removing a vertex, visualization data optimization process 248 may identify the output triangle that covers that physical location, and then interpolate the position, the geometric and shading normals using barycentric coordinates. If the interpolation gives a result that is very different from the original vertex position, visualization data optimization process 248 may cancel the operation.
12. When joining two edges, if either of those is at a surface bifurcation, visualization data optimization process 248 may cancel that operation. In one embodiment, visualization data optimization process 248 may split up meshes into pieces that do not intersect, to resolve this problem. This splitting will help the correct rendering of partially transparent meshes, which currently is a problem for most viewers.
13. When joining two edges, visualization data optimization process 248 may enforce that the resulting polygons are not concave. If they are, visualization data optimization process 248 may cancel the joining operation.
14. Visualization data optimization process 248 may also enforce that all input polygons must have the same material index (an alias for texture related properties). This also uniquely determines the material index of the output polygons.
15. When flipping edges, visualization data optimization process 248 may further enforce that the edge is not along a UV boundary, as flipping it would result in a UV stretching error.
16. When joining quads on two sides of an edge, visualization data optimization process 248 may enforce that neither of the resulting polygon edges, the proper frame of the polygon, are longer than some threshold. This amounts to enforcing that the edges are significantly shorter than the curvature radius of the polygon.
17. When joining quadrilaterals, visualization data optimization process 248 may monitor the maximum resulting area of the output quadrilateral and only allow this to gradually increase during decimation. The reason for this is that quad optimization tends to result in very coarse meshes very quickly and there should be a way to control that.

Figure 7B:
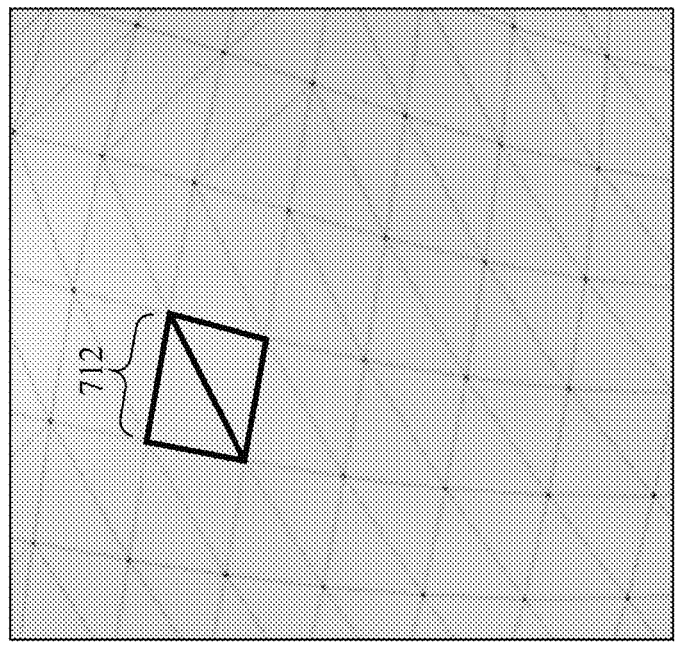
FIGS. 7A-7C illustrate an example of a three-dimensional (3D) object.
Figure 7A:
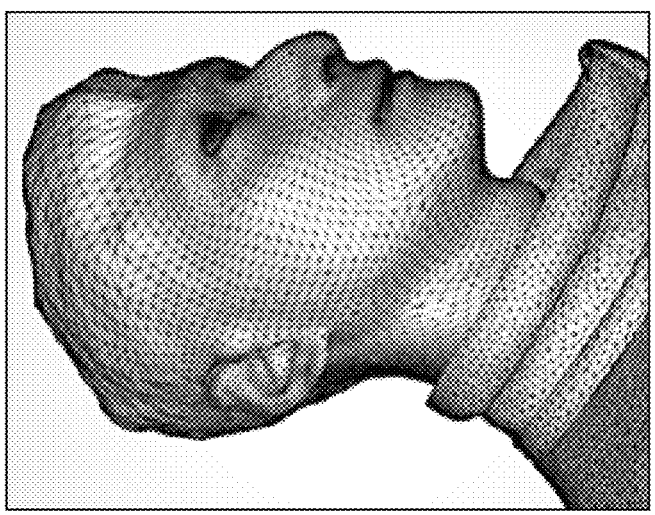
Figure 7C:
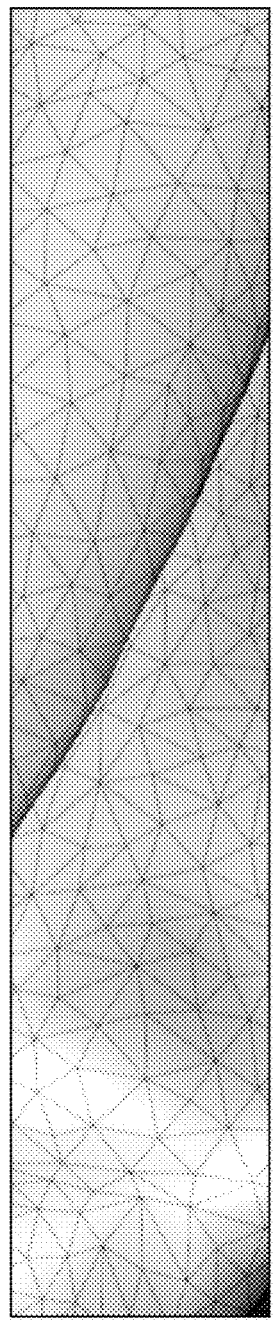

According to various embodiments, visualization data optimization process 248 may perform any or all of the following steps, during its mesh decimation operations:

1. Visualization data optimization process 248 may detect whether the mesh is a triangulated quad mesh or a genuine triangular mesh. For instance, consider the examples shown in FIGS. 7A-7C. As shown in FIG. 7A, the head of avatar 700 illustrates the use of triangulated quads. Indeed, FIG. 7B shows a section 710 of the head of avatar 700, which clearly shows that pairs of triangles, such as triangles 712, can be joined to form a rectangular quadrilateral. However, as shown in FIG. 7C, the clothing 720 of avatar 700 does not exhibit a pattern that warrants representing the mesh as a set of quadrilaterals. In this case, visualization data optimization process 248 may detect that the avatar body is built out of quadrilaterals (quads) and will optimize the corresponding mesh with an algorithm specific to quads. Then, the resulting optimized mesh will be triangulated and further optimization will be done using a triangular mesh optimization algorithm.
2. The quad based mesh optimization used by visualization data optimization process 248 amounts to recursively joining sets of four neighboring quads. However, unlike other mesh optimizations, visualization data optimization process 248 may first apply any or all of the sanity checks described previously, before actually performing the quad merger. In further embodiments, visualization data optimization process 248 may also carry through the parallel structure of the initial mesh (if any) while doing the quad mergers. Then, if four quads are to be merged and a parallel layer has four equivalent quads, the merger is done in parallel. If either layer violates any of the sanity checks, both quad mergers will be cancelled.
3. The tri-based mesh optimization by visualization data optimization process 248 will first focus on triangles that are very degenerate (it is collapsed to a single line or to a single point). Note that a lot of the sanity checks listed above are ill defined for such triangles. Visualization data optimization process 248 may collapse these into a single vertex while only enforcing that this collapse does not change the topology of the neighboring non-singular geometry. Then, visualization data optimization process 248 may iteratively decimate the meshes using a vertex removal operation. In other embodiments, visualization data optimization process 248 may also employ additional mesh reduction operations, such as collapsing a polygon into a single vertex (by 'pulling' all other vertices onto the target) or collapsing all edges connected to a point (this will collapse all polygons around a given vertex into this one vertex).

According to various embodiments, the control loop for the tri decimation in step above may proceed as follows:
   a. Sort all existing edges by their geometric length (defined as the Euclidean distance between the endpoints).
   b. Loop, starting with the shortest edge, and collapse all edges that are shorter than a threshold (small enough that all qualifying edges can be viewed as degenerate)
   c. Sort all remaining edges by their proper length (defined as the distance when the polygon is projected into the proper frame defined by its main curvature directions). Then, loop from short to long, attempting to collapse the edge (i.e., remove the vertex from either end).
   d. If there is at least one parallel mesh to the one that is being decimated and that parallel mesh has locally equivalent geometry (i.e., each polygon sharing at one or two vertices with the edge has a parallel equivalent) then first issue the 'editing request' for each of the parallel meshes in the neighborhood, meaning that visualization data optimization process 248 will run through the local geometry related sanity checks as well as the parallel-geometry imposed tests. If all editing requests can go through, then carry them all through in sync. If any of the parallel layers has a conflict, cancel the optimization step in all requests.

Figure 8B:
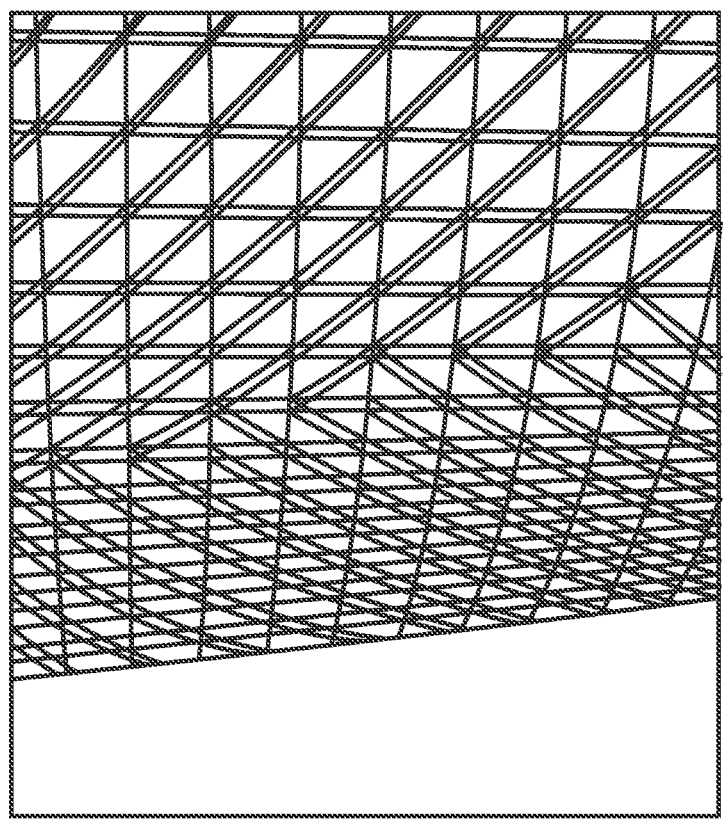
FIGS. 8A-8B illustrate an example of optimizing parallel geometries.
Figure 8A:
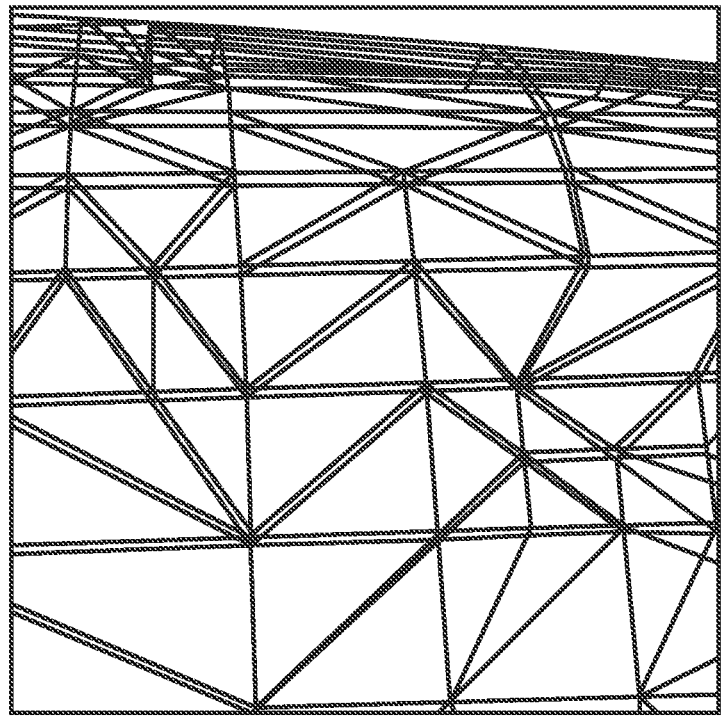

From the above, this means that if there are layers near each other that are very similar in structure (they are approximate instances of one another), visualization data optimization process 248 will keep them as such. For instance, consider the cases shown in FIGS. 8A-8B. Image 800 in FIG. 8A demonstrates the optimized form of the mesh in which each edge has a parallel counterpart, similar to the original mesh illustrates in image 810 in FIG. 8B.

More specifically, in various embodiments, visualization data optimization process 248 may perform parallel geometry removal (PG) by doing any or all of the following:

To perform the PG, visualization data optimization process 248 may first flag any intersecting polygons. This is an important part of preserving parallel geometry, correctly. The idea here is that if two layers do intersect, visualization data optimization process 248 needs to preserve that intersection. If they do not, visualization data optimization process 248 must not allow them to do so after decimation. Thus, it is better for visualization data optimization process 248 to 'face the truth' about initial intersections. Accordingly, visualization data optimization process 248 may loop through the entire scene's triangles, check for all nearby triangles and, if they intersect, flag both. This affects decimation as current software enforces that intersecting polygons cannot be optimized away. That means the crossing surfaces will be preserved at their initial location. In some embodiments, visualization data optimization process 248 may perform decimation along the line of intersection, e.g., by first splitting the triangles that intersect into smaller ones that are on either side of the intersection line.

The geometry behind detecting intersecting triangles is rather straightforward: given triangle ABC and DEF, perform a test to determine whether either of the three edges of triangle ABC intersect triangle DEF and vice versa. This means that visualization data optimization process 248 may check a total of six edges for intersection with a triangle.

Given a triangle ABC, with vertex position vectors $\overline{A}$, $\overline{B}$, $\overline{C}$, let two vectors $\overline{E_1}$ and $\overline{E_2}$ be defined as follows:

$$\overline{E_1} = \overline{B} - \overline{A}, \overline{E_2} = \overline{C} - \overline{A}$$

Then the cross product of these two vectors gives the normal to the plane of the triangle can be computed as follows:

$$\overline{N} = \overline{E_1} \times \overline{E_2}$$

A point $\overline{P}$ will be 'in front' of the triangle if the projection of $\overline{P} - \overline{A}$ onto $\overline{N}$ is positive:

$$\overline{N} \cdot (\overline{P} - \overline{A}) > 0$$

and it is 'behind' the triangle if this same projection is negative.

If the two ends of a segment (or edge) $[\overline{P_1,P_2}]$ are on the same side of the triangle, it will not intersect it. When the two ends are not on the same side, visualization data optimization process 248 also needs to check that the intersection point of the segment with the plane of the triangle falls within the triangle. This can be tested by first computing the (signed) distance of the two points from the plane, as follows:

$$c_1 = \overline{N} \cdot (\overline{P_1} - \overline{A}), c_2 = \overline{N} \cdot (\overline{P_2} - \overline{A})$$

The segment $[\overline{P_1,P_2}]$ will then intersect the triangle at point $$\overline{P_0} = c_1 \overline{P_1} + c_2 \overline{P_2}$$

Visualization data optimization process 248 may then compute the barycentric coordinates (u, v, w) of $P_0$ in triangle ABC, and if each of the three resulting values are between 0 and 1, determine that the intersection point is inside the triangle, meaning that the segment is intersecting the triangle.

Next, visualization data optimization process 248 may flag nearby, similar meshes. This is based on instance detection, detailed below. In general, visualization data optimization process 248 may perform the flagging by taking two meshes and checking whether a sizable portion of the first mesh is an instance of a sizable portion of the second, where the threshold for instance detection is loosened. Note that the meshes do not need to be exact copies of one another and just need to be more or less aligned. This aids optimization as if two meshes are parallel, then any polygon simplification on one of those meshes may have a parallel equivalent on the other mesh. The resulting shape error then will be similar between the two meshes, making it less likely that these will intersect as a result of the decimation step.

At its core, instance detection consists of solving the problem of finding an affine transformation between two sets of points that minimizes the mean square error (MSE) between them. If the MSE is below a certain threshold, then the two sets of points are instances of each other, that is, one can be transformed into the other by using the computed affine transform. To do so, visualization data optimization process 248 may perform the following, given two meshes:

Center one mesh on top of the other and compute the translation matrix T

Scale the centered meshes to they are the same size and compute the scale matrix S Compute the rotation matrix R which minimizes the MSE between the two meshes. This may be done in a number of ways, such as the following:

Let $P_1 = [P_1^0 \ldots P_1^N]$ be a 3×N matrix containing all points from the first mesh and $P_2 = [P_2^0 \ldots P_2^N]$ be a 3×N matrix containing all points from the second mesh Let $H = P_1 P_2^T$ Let $[U,S,V] = SVD(H)$, where SVD is the Singular Value Decomposition (SVD)

Then $R = VU^T$

After this process finishes, visualization data optimization process 248 may check the attributes of the vertices of each mesh for alignment. These vertex attributes may include, for instance, positions, as well as any number of normal, tangent, color, or UV layers. If all attributes of all vertices align for both meshes, the meshes are instances of each other. The total transform between the instances is M=TRS, where T, R and S are matrices given above. Visualization data optimization process 248 may repeat this for every pair of meshes present in the scene S. Visualization data optimization process 248 may then remove the detected instance meshes from memory and the output file, significantly reducing file size. For instance, consider a 3D stroller with four identical wheels. This is all usually done by hand. In gaming for instance if there is a level with lots of trees, the 3D artist will create duplicate instances. This is especially important for 3D scanned products as there is no way for a 3D scanner to instance.

In some embodiments, visualization data optimization process 248 may also perform intramesh instancing, which is particularly helpful for meshes that comprise hundreds of much smaller, topologically disjoint meshes. For instance, every stitch on a 3D shoe may exhibit these properties. To address this, visualization data optimization process 248 may perform the following for each mesh in the scene:

Detect all sub-meshes (topologically disjoint polygon sets) of the mesh. This can be done in a number of ways, such as using breadth first searching.

Split the sub-meshes into 'buckets' with similar polygon counts, so that each bucket contains sub-meshes of approximately equal size.

Run the first version of the instance detection operation on each bucket, in some embodiments.

If all N sub-meshes within a single bucket are instances of each other, replace them with a single mesh and N−1 instances.

As a second step of the PG optimization, visualization data optimization process 248 may next detect neighborhood/parallel geometries. Here, the optimization of the visualization data may introduce surface shape errors. Accordingly, keeping surfaces in the right order is very important for correct rendering. For instance, in the case of a 3D avatar wearing clothing, the skin of the avatar should not go through the clothing. For this reason, after sanitation but before decimation, visualization data optimization process 248 may map the neighborhood of each vertex in the entirety of the scene. Then, if an optimization operation affects any given vertex, visualization data optimization process 248 may run a sanity check to ensure that there are no new surface intersections produced as a result of the decimation event. More specifically, visualization data optimization process 248 may look at all nearby vertices and look at the polygons attached to the vertices and check whether they are crossing. If they are crossing, then visualization data optimization process 248 may prevent the mesh decimation from occurring. Indeed, correct neighborhood geometry mapping is essential for being able to decimate while preserving the nearby layers in the correct order. In addition to decimation, this step also affects the way obstructed parallel geometry is identified and removed.

As a third, and optional step with respect to parallel geometry removal, visualization data optimization process 248 may also remove any obstructed parallel geometry. Here, visualization data optimization process 248 may go straight from the neighborhood/PG detection to decimation, which can further improve the overall mesh decimation operations. To do so, visualization data optimization process 248 may first perform obstructed geometry removal, to flag polygons that are visible (e.g., from any of 128 possible directions or more). Next, visualization data optimization process 248 may remove those polys that are immediately behind a visible polygon, facing the visible poly. That is, if two layers are facing up and are next to each other and if the upper one is visible, the one below gets removed. If those same two layers are facing one up one down, nothing gets removed. This helps to remove multiple parallel, similarly oriented layers in some of the clothing assets, while also preserving the inner and outer layer of a thin material (e.g., a shirt) intact as those will be facing one in and one out. Parallel obstructed geometry removal is helpful in that it removes layers that are never visible. It also helps in that it removes the layer that is nearest to the outer, visible layer. Then, at decimation time, the remaining visible layer will face less restriction from the PG optimization standpoint, as there is more room for motion before crossing some other geometry. For this reason, parallel obstructed geometry removal affects both quad and tri decimation.

As noted above, visualization data optimization process 248 may assess the degeneracy of the geometry in the visualization data. According to various embodiments, visualization data optimization process 248 may do so using a custom measure of this degeneracy on scale from 0 (non-degenerate) to 1 (totally degenerate), or another suitable scale (e.g., from 0-10, etc.). To do so, for a polygon P of rank N the dimensionless quality coefficient is defined as the ratio of the area to the square of the perimeter, as follows:

$$Q(P_N) \equiv \text{area}(P_N)/\text{perimeter}(P_N)^2$$

Note that, for all values of N (that is, for polygons of any rank) there is a maximum achievable quality which is that of an equilateral N-gon. Intuitively this corresponds to the N-gon being inscribed into a circle, ensuring the vertices are equally spaced from each other on the perimeter of the sphere. Thus, this best achievable quality coefficient $Q_N$ can be computed by first computing the central angle between two neighboring vertices, as follows:

$$\beta = 2\pi/N$$

and then the perimeter and the area will be:

$$A_N = N \cdot \sin(\beta)/2, P_N = 2N \cdot \sin(\beta/2)$$

This yields the following:

$$Q_N = A_N/P_N^2 = [N \cdot \sin(\beta)/2]/[2N \cdot \sin(\beta/2)]^2$$

For a triangle, this gives:

$$\beta = 2\pi/3, \sin(\beta) = \sqrt{3}/2, \sin(\beta/2) = \sqrt{3}/2$$

giving:

$$Q_3 = (3 \cdot \sqrt{3}/4)/(6 \cdot \sqrt{3}/2)^2 = \sqrt{3}/36 \approx 0.05$$

For a polygon with very large N, the quality coefficient will converge towards the area of the unit sphere divided by its perimeter squared, as follows:

$$Q(\text{sphere}) = \pi/(2\pi)^2 = 1/(4\pi) \cong 1/12.6 \approx 0.08$$

The degeneracy of polygon P of rank N will then be written as:

$$D(P_N) \equiv 1 - Q(P_N)/Q_N$$

By implication, if the polygon is similar (or has a proportional shape) to the equilateral convex counterpart (the one inscribed into a sphere), it has a degeneracy of zero. On the other side, if it is squished in some sense (has zero area), it will have a degeneracy of one. For a polygon that has only degenerate edges (that is, all vertices are at the same point) degeneracy is undefined. However, these polygons may be removed at sanitization time, before optimization, so this is not a concern. This is the quantity that visualization data optimization process 248 may monitor throughout its mesh decimation operation and will decide on each individual decimation event, partly, based on the degeneracy of the input vs the output polygons.

With respect to the curvature tensor, proper frame, and related quantities computed by visualization data optimization process 248, visualization data optimization process 248 may rely on existing curvature tensor math. In particular, visualization data optimization process 248 may compute the curvature tensor of the polygon and then use the second source as a baseline for computing the eigenvalue problem from the curvature tensor, yielding the principal curvature axis as well as the principal curvature radii associated with each polygon. In contrast to existing approaches, though, visualization data optimization process 248 may then subsequently define the proper frame for a polygon and compute various quantities of the polygon in this frame, defined by its curvature tensor.

More specifically, given a polygon of rank N>3, visualization data optimization process 248 may approximate the curvature tensor of this polygon with that of one of the associated triangles (formed by any three consecutive vertices). The curvature tensor of a triangle ABC can be computed either by using the mean geometric normal at the vertices, or (if provided) the shading normal data from the 3D input. Let $\overline{N_x}$, X=A, B, C be the normals at the vertices, normalized to unit length; let $\overline{P_x}$, X=A, B, C be the position vector of the three vertices. Assume that the u-axis extends along the segment AB, with length |AB|, and the v-axis extends along the segment AC, with length |AC|. Then the linear curvature along these segments will be:

$$d\overline{n}/du = (\overline{N_B} - \overline{N_A})/|AB|$$

$$d\overline{n}/dv = (\overline{N_C} - \overline{N_A})/|AC|$$

Visualization data optimization process 248 may also compute the rate of change of the position vector along these axes, as follows:

$$d\overline{X}/du = (\overline{X_B} - \overline{X_A})/|AB|$$

$$d\overline{X}/dv = (\overline{X_C} - \overline{X_A})/|AC|$$

This gives the following:

$$d\overline{x}/du = d\overline{X}/du - \overline{N_A} \cdot (\overline{N_A} \cdot d\overline{X}/du)$$

$$d\overline{x}/dv = d\overline{X}/dv - \overline{N_A} \cdot (\overline{N_A} \cdot d\overline{X}/dv)$$

Next, the following scalars are also defined:

$$E = d\overline{x}/du \cdot d\overline{x}/du$$

$$F = d\overline{x}/du \cdot d\overline{x}/dv$$

$$G = d\overline{x}/dv \cdot d\overline{x}/dv$$

$$L = -d\overline{n}/du \cdot d\overline{x}/du$$

$$M_1 = -d\overline{n}/du \cdot d\overline{x}/dv$$

$$M_2 = -d\overline{n}/dv \cdot d\overline{x}/du$$

$$N = -d\overline{n}/dv \cdot d\overline{x}/dv$$

The Weingarten curvature matrix $w_{ij}$ will then be:

$$\rho = 1/(E \cdot G - F^2)$$

$$w_{11} = \rho(L \cdot G - M_1 \cdot F)$$

$$w_{12} = \rho(M_2 \cdot G - N \cdot F)$$

$$w_{21} = \rho(M_1 \cdot E - L \cdot F)$$

$$w_{22} = \rho(N \cdot E - M_2 \cdot F)$$

The eigenvalues of this curvature matrix give the principal curvatures while the eigenvectors provide the principal curvature directions. In order to compute those, visualization data optimization process 248 may proceed further and compute the following:

$$T = w_{11} + w_{22}$$

$$D = w_{11} \cdot w_{22} - w_{12} \cdot w_{21}$$

$$d = \sqrt{T^2/4 - D}$$

Note that when numerical error leads to the argument of the square root being a small negative number, it may be set to zero.

Depending on the magnitude of d, processing by visualization data optimization process 248 may branch off in two different ways. A small value of d means that the eigenvalues of the curvature tensor are very close (meaning there is a sphere). In this case, the curvature radii coincide with the radius of the sphere, $k_1 = k_2 = R = T/2$, where R is the radius of the sphere that locally approximates the surface. This means that the principal curvature directions are arbitrary (one is as good as the other) and visualization data optimization process 248 may form orthonormal dyad as follows:

$$\overline{v_1} = d\overline{x}/du + d\overline{x}/dv$$

$$\overline{v_2} = d\overline{x}/du - d\overline{x}/dv$$

For larger values of d (in practice, $d > 10^{-3}$) the principal curvature values will be:

$$k_1 = T/2 + d, k_2 = T/2 - d$$

Next, the eigenvectors need to be identified, which correspond to the principal curvature directions. Special care may be taken for cases in which one of the curvatures is very small (e.g., there is a cylinder-type surface, etc.).

If the magnitude of $w_{21}$ is larger than both the magnitude of $w_{12}$ and it is not within rounding error from zero, this results in the following:

$$W_{11} = k_1 - w_{22}$$

$$W_{21} = k_2 - w_{22}$$

$$W_{12} = W_{22} = w_{21}$$

Alternatively, if the magnitude of $w_{12}$ is not within rounding error from zero, the following results:

$$W_{12} = k_1 - w_{11}$$

$$W_{22} = k_2 - w_{11}$$

$$W_{11} = W_{21} = w_{12}$$

If neither of the above conditions hold, hold (meaning that the curvature matrix is already diagonal within numerical error), the following may be used:

$$W_{11} = W_{22} = 1$$

$$W_{21} = W_{21} = 0$$

This allows the principal curvature direction vectors to be defined as:

$$\overline{v_1} = W_{11} \cdot d\overline{x}/du + W_{12} \cdot d\overline{x}/dv$$

$$\overline{v_2} = W_{21} \cdot d\overline{x}/du + W_{22} \cdot d\overline{x}/dv$$

The proper frame of the polygon will be defined in terms of the principal curvature values and vectors, with the two axes aligned with the two curvature directions and scaled by the curvature values. In order to avoid numerical errors, visualization data optimization process 248 may impose a lower bound on the scaling factor, effectively imposing that the curvature radii of the proper frame are no larger than ten times the bounding box diagonal of the mesh. With this restriction, the length of the principal curvature directions $\overline{v_1}, \overline{v_2}$ will be normalized by these augmented curvature radii.

From this, visualization data optimization process 248 can project the coordinates of the polygon into this curvature-defined 'proper' frame and can compute the proper area and proper degeneracy. These are now geometry driven quantities. A triangle that has a small proper degeneracy will be shorter in the direction of larger curvature and longer along the smaller curvature. During mesh decimation, visualization data optimization process 248 may monitor the proper degeneracy and area of the input and output triangles and impose constraints on decimation events that can happen, based on these quantities. This means that the mesh will converge onto a distribution where higher curvature areas will be denser and lower and flatter areas will be sparser in terms of vertices/triangles.

Also as mentioned earlier, for each decimation event, the geometry change must go through a number of sanity checks, before visualization data optimization process 248 finalizes the decimation. The problem in this is that there are a lot of reasons why decimation would be 'cancelled,' meaning reduced mesh decimation. In some embodiments, one way to mitigate it is to use some of the additional degrees of freedom (or, redundancy in the data representation) so that visualization data optimization process 248 can compensate for the additional errors caused by additional aggression in the decimation. In this particular case the compensated quantity is the surface normal. Geometrically, the surface normal is defined very clearly. In the 3D world, there are two concepts of this normal, the 'geometric normal' (the normal to the plane of the triangles) and the 'shading normal' (an additional vector field associated with the mesh, possibly different from the geometric normal). This shading normal can be used to produce smoothing effects. A third piece of the normal data is embedded in the texture files. That is, if the normal textures are defined, then at each point in the triangle one can reach back to the associated pixel coordinate of the texture file, read the normal vector and combine this with the shading (or geometric) normal data to compute the normal that is actually used in rendering.

As would be appreciated, normal baking is the process where the texture normal data is adjusted, to minimize the rendered image difference between the original and the decimated mesh. Typical normal baking approaches reduce the geometry into a single mesh, create a global mapping of the mesh triangles onto a texture file ('UV mapping') and then use a heuristic approach (e.g., form a 'light cage', then study light scattering off the mesh) to reverse engineer the normal data that goes into the texture file. In contrast, the techniques herein propose visualization data optimization process 248 performing any or all of the following, according to various embodiments:

1. Sanitize and decimate the geometry.
2. If shading normals are not given in the decimated mesh, compute them from geometric normals.
3. Do a smoothing of the shading normal data on the decimated mesh, while keeping the edge creases in place.
4. Rasterize the geometry. This means that, for each triangle on the decimated mesh, visualization data optimization process 248 may identify the pixels in the texture file that belong to the triangle. This can be done using the 'UV' coordinates on the mesh which map parts of the 3D surface onto parts of the unit square in the 2-dimensional plane. This rasterization needs to be done on both the original and the decimated mesh.
5. Loop through each pixel in the texture file. If it cannot be associated with a triangle in both the original and the decimated mesh, visualization data optimization process 248 may skip to the next pixel.
6. Construct the tangent-bitangent-normal (TBN) frame in both the original and the decimated meshes. If available, visualization data optimization process 248 may use the shading normals.
7. Read the pixelated normal data. This consists of three integers, ranging from 0 to 255. Subtract 127 from each component; multiply the resulting values with the TBN vectors. This gives a normal vector in the global frame of the scene.
8. Take this global frame normal vector and project it onto the TBN frame of the decimated mesh.
9. Shift the vector components by 0.5, Normalize it such that the longest component is 255.
10. Truncate the result to three integers, write them into the pixelated normal texture data.

As would be appreciated, a goal of 3D optimization/compression is to simplify 3D models down to acceptable files size and polygon limits for web and mobile platforms. The process of optimization, naturally, results in 3D and texture data loss which can potentially reduce the output 3D model topology, as well as the material quality. To evaluate the output quality, in various embodiments, the techniques herein further introduce a testing pipeline that makes comparisons between the original and the optimized 3D models, automatically detects the error levels, and/or provides the visual defects and the data analytics to a user interface for review.

Two potential ways to determine the error between two 3D models are as follows:
1. 3D topology comparison—this approach makes comparisons between the 3D surfaces of each model and detects the differences. For instance, this can be used in the optimization process to prevent excessive shape distortion. However, this approach is also not reliable from the perspective of the user. Indeed, even if the topology of the model exhibits a significant amount of distortion, the texture data can potential fix the issue to make the model look pretty close to the original.
2. Visual inspection through pixel comparison—this approach requires 2D renderings of both models from various angles. Once the images are available, the system will perform Image Quality Assessment (IQS) testing. Example IQS quality measurements may include, for instance, Mean Square Error (MSE), Peak Signal to Noise Ratio (PSNR), which is well suited for texture compression analysis, Structured Similarity Index Method (SSIM), and the Feature Similarity Index Method (FSIM), which is well suited for texture baking analysis. Details on each of these approaches is provided below. Each of these evaluates the image differences that provides valuable scoring information to visualization data optimization process 248. If the evaluation scores are over or below the certain value visualization data optimization process 248 may automatically generate the warning by outlining the area that has the most error on the model and storing that data for analytics. The outlining is visual and visualization data optimization process 248 may generate an additional image that has the outlines areas. This will help manual inspect the visual defects of the output file.

With respect to MSE, visualization data optimization process 248 may compute the MSE as follows between a first image g(x,y) and a second image ĝ(x,y) as follows:

$$MSE = \frac{1}{MN}\sum_{N=0}^{M}\sum_{m=1}^{N}[\hat{g}(n,m) - g(n,m)]^2$$

Similarly, visualization data optimization process 248 may use the RMSE to determine the error magnitude between a predictor and its actual value. For instance, assume that $\hat{\theta}$ is the estimator for a parameter θ. In such a case, visualization data optimization process 248 may compute the RMSE as follows:

$$RMSE(\hat{\theta}) = \sqrt{MSE(\hat{\theta})}$$

Visualization data optimization process 248 may also use PSNR to evaluate the ratio between the signal power and the distorting noise that affects the quality of the image and is typically in decibel form. For instance, visualization data optimization process 248 may compute the PSNR as follows:

$$PSNR = 10\ \log_{10}(peakval^2)/MSE$$

Here, visualization data optimization process 248 may use the PSNR to measure the quality of reconstruction of lossy image compression codecs.

Visualization data optimization process 248 may also use the SSIM approach, to evaluate the change in perception in the structural information between the models. More specifically, SSIM measures the similarity/difference between the two images and can be used by visualization data optimization process 248 to compare the original and its compress/optimized version. In further cases, visualization data optimization process 248 may leverage three-component SSIM (3-SIM) that takes into account the fact that humans are better at identifying differences in textured regions of an image than smooth regions.

In a further case, visualization data optimization process 248 may also use FSIM testing, to compare the original image and its compressed/optimized form. As would be appreciated, FSIM leverages phase congruence and gradient magnitude computations, and use these computations to determine the feature similarities between the two images.

Once there is enough data, visualization data optimization process 248 may be able to learn to identify the root cause of the issue using machine learning, according to various embodiments. Indeed, machine learning can help to improve the automated inspection models, thereby automating the entire inspection process and providing meaningful historical data that can help to identify how the overall optimization methods have been improved.

Example machine learning techniques that visualization data optimization process 248 may leverage for the inspection may include, but are not limited to, any or all of the following: classification approaches, regression approaches, neural networking or deep learning approaches, forest or decision tree-based approaches, support vector machine approaches, or the like. As would be appreciated, other forms of machine learning models could also be used and in a supervised, semi-supervised, or unsupervised manner.

In general, the machine learning model of visualization data optimization process 248 will model image features such as texture compression, normal sanitization, or the like. For example, every time an asset image has been inspected, the user may be able to tag the outlined errors as a specific feature error, thereby providing feedback to visualization data optimization process 248. This will train visualization data optimization process 248 to identify the issues, accordingly, and report them in more meaningful manner. This can also allow visualization data optimization process 248 to perform a general evaluation of any of the above tests, to identify areas of an image where improvements may be required.

A prototype system was built, to demonstrate the efficacy of the techniques herein. Below is a listing of the tasks that the prototype optimizer was configured to run on a given asset:

Global_LoadTextures—Load textures into memory from disk.

Global_ConvertSpecGloss—Convert textures from specular glossiness to metallic roughness PBR workflow.

Global_CropTextures—Crop textures to minimal used rectangle.

Global_FillTextures—Fill unused parts of the textures with nearest neighbor values in order to prevent color bleeding due to interpolation.

Global_TextureTexelDensityResize—Calculate new texture target sizes based on texel density.

Global_ForcePoTTextures—Force texture target sizes to power-of-two dimensions.

Global_ResizeTexturesToMaxSize—Clamp texture target sizes to maximum allowed texture size (1 k/2 k/Original size in the platform UI).

Global_ResizeTexturesToTargetSize—Resize the textures to target size computed by Global_TextureTexelDensityResize/Global_ForcePoTTextures/Global_ResizeTexturesToMaxSize. Doing the resize only once improves resampling quality.

Global_OptimizeTextures—Compress textures either losslessly or lossyly with third party tools.

Global_WriteTextures—Write textures to disk.

Global_CalculateMaterialData—Calculate per polygon material data, such as transparency.

Global_DetectInstances—Detect inter mesh instances (instances between separate meshes). Instance detection Global_SaveRawVertexPositions—Save the original vertex positions (before vertices get shifted by tiny amounts during sanitation)

Global_TruncateVectorContainers—Truncate UV vector positions

MapCollocatedEdgesAndVertices—Map connectivity info between vertices, edges and polys Global_DetectIntraMeshInstances—Detect intra mesh instances (instances inside a single mesh). Instance detection SetupMeshRelationshipsAndPrepareOGR—Run a basic level of sanitation as required by OGR Global_RemoveDecoupledVertices—Remove vertices that are disconnected from all polys (either from input or due to decimation)

Global_FlagPolygonsWithFlippedWinding—Call on the OGR driver to detect which polygon is visible from the front side, which is visible from the backside.

Global_SanitizeShadingNormals—Fill in missing shading normals, flip shading normals if inconsistent with the polygon winding.

Global_UpdateObstructedStats—Save vertex-, edge- and poly-counts after OGR

Global_RemoveObstructedGeometry—Remove geometry that is obstructed by other (non-transparent) geometry.

Setup/Global_Setup

SanitizeAndPrepareOptimization—Run full sanitation as required by decimation.

Global_Smoothing—Applies normal smoothing to the entire scene, by averaging shading normal data (if available) or using mesh geometry.

Global_SmoothSmallPolygons—Applies normal smoothing to tiny (or degenerate) polygons.

Global_ComputeVertexShadingNormals—At each vertex will compute the shading normal based on either shading normal data from adjacent polys or from the mesh geometry.

Global_DetectNeighborhoodGeometry—Map out vertex neighborhoods. This allows for tracking parallel geometry during decimation.

Global_RemoveParallelObstructedGeometry—Remove geometry that is just behind visible geometry and is winding the same way as the nearby visible poly Global_FlagIntersectingPolygons—Flag all polygons that intersect another poly Global_ComputeThresholds—Allocate decimation quotas and aggression thresholds to individual meshes within the scene.

Global_QuadMerge—Quad-based mesh decimation

Global_MakeQuads—Build quads from neighboring triangles for meshes that are triangulated quads.

Global_MakeTris—Triangulate all polygons, based on initial vertex valence, vertex curvature and vertex angles.

Global_Coarsen-Tri-based mesh decimation

Cleanup/Global_Cleanup—Remove unused vertices, edges and polys, compactify vector containers as required by final IO.

Figure 9:
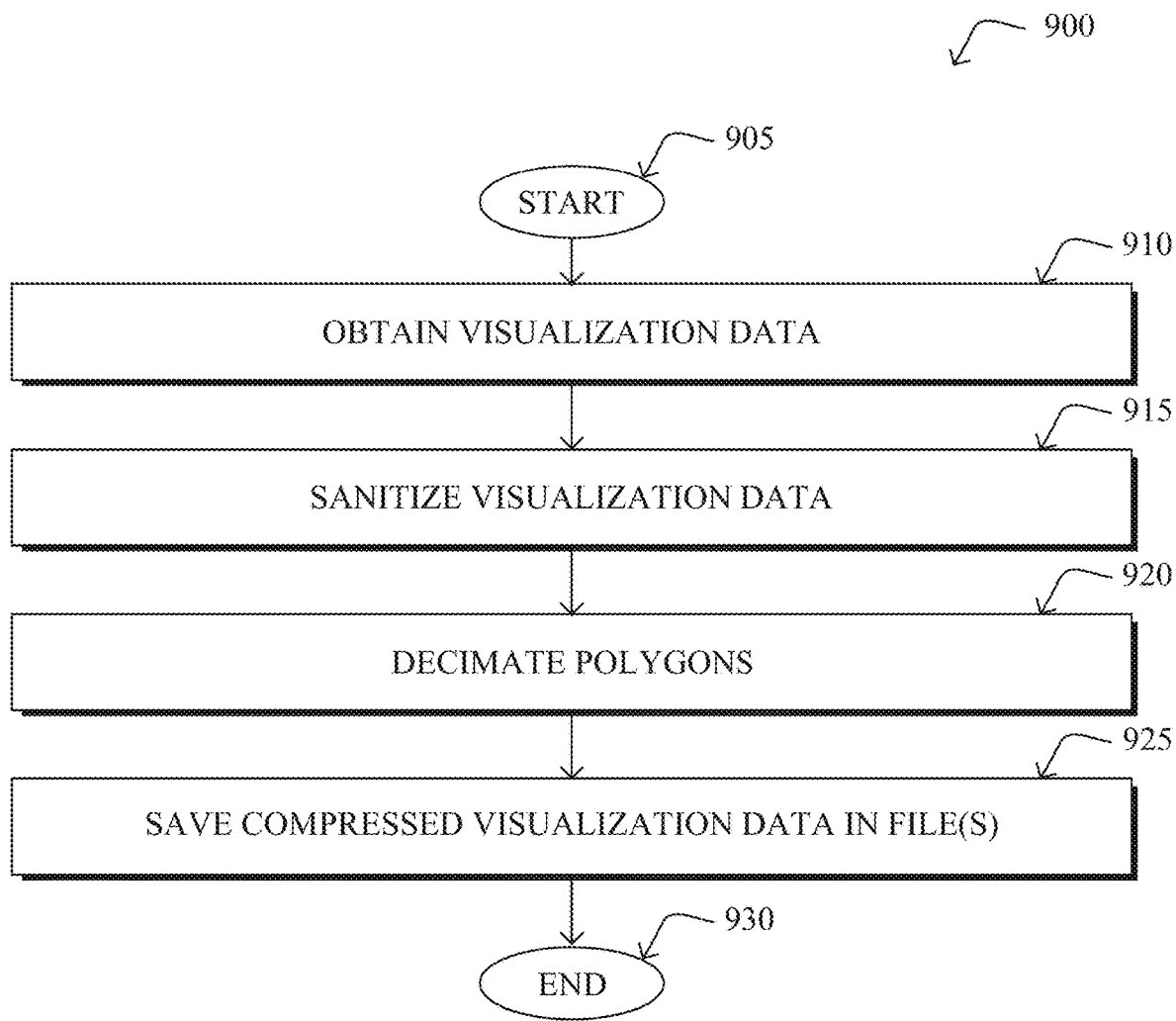
FIG. 9 illustrates an example simplified procedure for optimizing visualization data.

FIG. 9 illustrates an example simplified procedure for optimizing visualization data, according to various embodiments. For example, a non-generic, specifically configured device (e.g., device 200) may perform procedure 900 by executing stored instructions (e.g., visualization data optimization process 248). The procedure 900 may start at step 905, and continues to step 910, where, as described in greater detail above, the device may obtain visualization data. In some embodiments, the visualization data may depict at least one three-dimensional object and comprise any number of polygons (e.g., triangles, quadrilaterals, etc.) that form meshes. The visualization data may further comprise texture data associated with the three-dimensional object.

At step 915, as detailed above, the device may sanitize the visualization data. In general, the sanitization operation may fix errors that are typical when exporting visualization data. In various embodiments, this operation may include identifying neighboring polygons of at least one three-dimensional object and their windings. This operation may also include correcting errors in the neighboring polygons and their windings.

At step 920, the device may decimate meshes of polygons in the sanitized visualization data, to form compressed visualization data, as described in greater detail above. As would be appreciated, by decimating/removing polygons from the visualization data, this will naturally reduce its amount of data. This allows for faster download of the visualization data, as well as rendering the visualization data on an endpoint. In various embodiments, the device may also perform one or more sanity checks, prior to performing an atomic decimation operation. Doing so further ensures that the decimation operations do not adversely affect the look of the visualization data after undergoing decimation.

At step 925, as detailed above, the device may store the compressed visualization data in one or more files. In some embodiments, these file(s) may have a different file format than that of the obtained visualization data. In other words, in some instances, the device may be configured to support the translation of file formats, while also optimizing the visualization data being translated. In further embodiments, the device may upload the file(s) to an online service for download. For instance, the device may translate a 3D file into another format that is suitable for upload to a social media service (e.g., Facebook, Instagram, etc.), enterprise system (e.g., SAP, Oracle, etc.), online retailer (e.g., Amazon, etc.), or the like. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for mesh optimization for image processing. In particular, as mentioned herein, the techniques herein provide efficient compression of the data before it is loaded into the rendering engine, reducing the download file size and the number of triangles in the image so less powerful devices can download and process an image quickly. Specifically, the techniques herein simplify over-resolved 3D surface meshes while controlling the loss of quality due to mesh reduction. In addition, the techniques herein support the conversion of visualization data from one format to another, without undue loss to the quality of the image.

While there have been shown and described illustrative embodiments, it is to be understood that various other adaptations and modifications may be made within the spirit and scope of the embodiments herein. For example, the embodiments described herein may be used with other suitable rendering techniques, technologies, or formats, and those shown herein are merely examples. Also, while the embodiments have been generally described in terms of images, static or video images may benefit from the techniques herein, depending upon computational power. Further, additional processing may also be performed on the images, such as converting the image to a holographic display or projection, and so on.

Moreover, the embodiments herein may generally be performed in connection with one or more computing devices (e.g., personal computers, laptops, servers, specifically configured computers, cloud-based computing devices, cameras, mobile phones, etc.), which may be interconnected via various local and/or network connections. Various actions described herein may be related specifically to one or more of the devices, though any reference to particular type of device herein is not meant to limit the scope of the embodiments herein.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
obtaining, by a device, visualization data that depicts at least one three-dimensional object;
sanitizing, by the device, the visualization data, in part by:
identifying neighboring polygons of the at least one three-dimensional object and their windings, and
correcting errors in the neighboring polygons and their windings;
decimating, by the device, meshes of polygons in the sanitized visualization data, to form compressed visualization data, by:
performing one or more sanity checks, prior to performing one or more decimation operations during the decimating; and
storing, by the device, the compressed visualization data in one or more files.

2. The method as in claim 1, wherein the obtained visualization data is obtained from one or more files that use a different file format than that of the one or more files in which the compressed visualization data is stored.

3. The method as in claim 1, further comprising:
determining, by the device, whether each polygon in the visualization data is a visible polygon, in part by testing whether that polygon is reachable by at least one of a plurality of light rays extending from infinity; and
removing, by the device, any polygon from the visualization data that is not a visible polygon.

4. The method as in claim 3, wherein determining whether each polygon in the visualization data is a visible polygon further comprising:
iteratively testing whether a given polygon is visible by a visible polygon and, if so, deeming that polygon as being a visible polygon.

5. The method as in claim 1, wherein the one or more sanity checks comprise at least one of: determining whether a set of polygons intersect another polygon, determining whether a decimated set of polygons would intersect another polygon, determining whether a local curvature of a set of polygons would be preserved after undergoing the atomic decimation operation, or determining whether a maximum curvature of a set of polygons would exceed a predefined threshold after undergoing the atomic decimation operation.

6. The method as in claim 1, wherein the one or more sanity checks comprise at least one of: determining whether a degeneracy of a set of polygons would increase after the set of polygons undergoes the atomic decimation operation, ensuring that orientations of a set of polygons would be preserved after undergoing the atomic decimation operation, ensuring that a set of neighboring polygons undergoing the atomic decimation operation are also neighbors in a UV space, or ensuring that shading and geometric normal errors resulting from the atomic decimation operation are within a predefined threshold.

7. The method as in claim 1, wherein the one or more sanity checks comprise at least one of: ensuring that the atomic decimation operation does not result in an edge of a polygon having a curvature greater than a defined threshold, ensuring that two edges of polygons to be joined are not bifurcated, ensuring that joining two edges of polygons will not result in a concave edge, or ensuring that an edge to be flipped is not along a UV boundary.

8. The method as in claim 1, wherein the one or more sanity checks comprise at least one of: ensuring that two quadrilaterals to be joined by the atomic decimation operation would not result in an area larger than a defined size, ensuring that a polygon edge that would result from joining two quadrilaterals is not longer than a defined threshold, or ensuring that the atomic decimation operation would not shift a vertex by a predefined amount.

9. The method as in claim 1, further comprising:
assigning a material index to a particular mesh, wherein the material index indicates at least one of: a degree of metalness, roughness, or specularity of the particular mesh.

10. The method as in claim 9, wherein the one or more sanity checks comprise ensuring that a material index of a mesh to be joined with the particular mesh by the atomic decimation operation matches the material index of the particular mesh.

11. The method as in claim 9, further comprising:
compressing textures of the visualization data, wherein a degree of compression applied to a particular texture is based on its associated material index.

12. The method as in claim 1, further comprising:
applying, by the device, instance detection to two meshes, to determine whether the two meshes are instances of one another; and
removing, by the device, duplicate instances from the visualization data.

13. The method as in claim 11, further comprising:
applying instance detection to buckets of sub-meshes of the two meshes.

14. The method as in claim 1, wherein decimating the meshes comprises:
identifying parallel geometries in the visualization data by:
flagging intersecting polygons,
applying instance detection, to identify meshes that are similar to one another, and
identifying the parallel geometries, based in part on the flagged intersecting polygons and meshes that are similar to one another.

15. The method as in claim 14, wherein decimating the meshes comprises:
removing obstructed parallel geometries from the visualization data.

16. The method as in claim 1, wherein decimating the meshes comprises:
performing normal baking on the visualization data.

17. The method as in claim 1, further comprising:
uploading the one or more files to an online service for download.

18. The method as in claim 1, further comprising:
quantifying degeneracy of a particular polygon on a numeric scale.

19. The method as in claim 1, further comprising:
using a machine learning model to compare the visualization data and the compressed visualization data.

20. A tangible, non-transitory, computer-readable medium storing program instructions that cause a device to execute a process comprising:
obtaining, by the device, visualization data that depicts at least one three-dimensional object;
sanitizing, by the device, the visualization data, in part by:
identifying neighboring polygons of the at least one three-dimensional object and their windings, and
correcting errors in the neighboring polygons and their windings;
decimating, by the device, meshes of polygons in the sanitized visualization data, to form compressed visualization data, by:
performing one or more sanity checks, prior to performing one or more decimation operations during the decimating; and
storing, by the device, the compressed visualization data in one or more files.

21. An apparatus, comprising:
one or more network interfaces;
a processor coupled to the one or more network interfaces and configured to execute one or more processes; and
a memory configured to store a process that is executable by the processor, the process when executed configured to:
obtain visualization data that depicts at least one three-dimensional object;
sanitize the visualization data, in part by:
identifying neighboring polygons of the at least one three-dimensional object and their windings, and
correcting errors in the neighboring polygons and their windings;
decimate meshes of polygons in the sanitized visualization data, to form compressed visualization data, by:
performing one or more sanity checks, prior to performing one or more decimation operations during the decimating; and
store the compressed visualization data in one or more files.

\* \* \* \* \*